US010574461B2

(12) United States Patent
Hughes et al.

(10) Patent No.: US 10,574,461 B2
(45) Date of Patent: Feb. 25, 2020

(54) STREAMING AUTHENTICATION AND MULTI-LEVEL SECURITY FOR COMMUNICATIONS NETWORKS USING QUANTUM CRYPTOGRAPHY

(71) Applicant: LOS ALAMOS NATIONAL SECURITY, LLC, Los Alamos, NM (US)

(72) Inventors: Richard John Hughes, Los Alamos, NM (US); Jane Elizabeth Nordholt, Los Alamos, NM (US); Charles Glen Peterson, Los Alamos, NM (US); Kush T. Tyagi, Los Alamos, NM (US); Christopher C. Wipf, Los Alamos, NM (US); Raymond Thorson Newell, Santa Fe, NM (US); Kevin P. McCabe, Los Alamos, NM (US); Nicholas Dallmann, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 239 days.

(21) Appl. No.: 15/026,024

(22) PCT Filed: Sep. 30, 2014

(86) PCT No.: PCT/US2014/058424
§ 371 (c)(1),
(2) Date: Mar. 30, 2016

(87) PCT Pub. No.: WO2015/102694
PCT Pub. Date: Jul. 9, 2015

(65) Prior Publication Data
US 2016/0248586 A1    Aug. 25, 2016

Related U.S. Application Data

(60) Provisional application No. 61/884,753, filed on Sep. 30, 2013.

(51) Int. Cl.
H04L 29/06    (2006.01)
H04L 9/32    (2006.01)
H04L 9/08    (2006.01)

(52) U.S. Cl.
CPC .......... *H04L 9/3226* (2013.01); *H04L 9/0852* (2013.01); *H04L 63/08* (2013.01)

(58) Field of Classification Search
CPC .................................................... H04L 9/0852
See application file for complete search history.

(56) References Cited

U.S. PATENT DOCUMENTS 7,639,947 B2    12/2009    Luo et al.
7,787,623 B2    8/2010    Akiyama et al.
(Continued)

FOREIGN PATENT DOCUMENTS

WO    2012044852 A1    4/2012
WO    WO-2012/044855    4/2012
WO    WO-2013/048674    4/2013

OTHER PUBLICATIONS

Gordon, "Very Simple Method to Find the Minimum Polynomial of an Arbitrary Nonzero Element of a Finite Field," Electronics Letters 12, pp. 663-664 (1976) (2 pages).
(Continued)

*Primary Examiner* — Jason K Gee
(74) *Attorney, Agent, or Firm* — Pierce Atwood LLP; Kevin M. Farrell; Christopher A. Baxter

(57) ABSTRACT

Message authenticators for quantum-secured communications facilitate low-latency authentication with assurances of security. Low-latency message authenticators are especially valuable in infrastructure systems where security and latency constraints are difficult to satisfy with conventional non-quantum cryptography. For example, a message transmitter receives a message and derives an authentication tag for the message based at least in part on an authenticator that
(Continued)

uses one or more quantum keys. The message transmitter outputs the message and its authentication tag. A message receiver receives a message and authentication tag for the message. The message receiver derives a comparison tag for the message based at least in part on an authenticator that uses one or more quantum keys. The message receiver checks whether the message is authentic based on a comparison of the authentication tag and the comparison tag. In example implementations, the authenticator uses streamwise cyclic redundancy code operations.

22 Claims, 11 Drawing Sheets

(56) References Cited

U.S. PATENT DOCUMENTS

| | | | |
|---|---|---|---|
| 7,993,905 B2 | 8/2011 | Singhvi et al. | |
| 2004/0109564 A1* | 6/2004 | Cerf | H04L 9/0858 380/256 |
| 2005/0271203 A1* | 12/2005 | Akiyama | H04L 9/3093 380/30 |
| 2006/0093376 A1* | 5/2006 | Mitchell | H04B 10/70 398/183 |
| 2008/0037790 A1* | 2/2008 | Berzanskis | H04L 9/0852 380/278 |
| 2008/0144833 A1* | 6/2008 | Matsumoto | H03M 13/1102 380/278 |
| 2009/0106553 A1* | 4/2009 | Wang | A63B 7/00 713/168 |
| 2009/0240913 A1* | 9/2009 | Obana | H04L 9/0662 711/216 |
| 2010/0115277 A1 | 5/2010 | Roscoe | |

OTHER PUBLICATIONS

International Search Report and Written Opinion for International Patent Application No. PCT/US2014/058424 dated Jun. 25, 2015 (11 pages).

Shoup, "Fast Construction of Irreducible Polynomials over Finite Fields," Journal of Symbolic Computation 17, pp. 371-391 (1994) extended abstract in Proc. 4th Annual Symposium on Discrete Algorithms (SODA) pp. 484-492 (1993) (22 pages).

Xu et al., "Fixed-point Analysis and Realization of a Blind Beamforming Algorithm," Proc. SPIE 3807, 188-199 (1999) (14 pages).

Krawczyk "LFSR-based Hashing and Authentication" Advances in Cryptology; 1994; vol. 839; pp. 129-139.

* cited by examiner

QKD to acquire keys for authenticators distributing keys for authenticators

STREAMING AUTHENTICATION AND MULTI-LEVEL SECURITY FOR COMMUNICATIONS NETWORKS USING QUANTUM CRYPTOGRAPHY

CROSS REFERENCE TO RELATED APPLICATIONS

This application claims the benefit under 35 U.S.C. § 119(e) of the following application, the contents of which are incorporated by reference herein:

U.S. Provisional Application No. 61/884,753, entitled Streaming Authentication And Multi-Level Security For Communications Networks Using Quantum Cryptography, filed on Sep. 30, 2013.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure relates generally to encryption systems and methods, and, more specifically, to systems and methods for securing quantum communications.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages. The process of producing such keys through QC is also called quantum key distribution ("QKD").

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QKD, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (×) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Other approaches to QC exploit other quantum properties (e.g., quantum entanglement) to exchange information encoded in quantum states. In addition, techniques such as privacy amplification can be used to eliminate the partial information that an eavesdropper can acquire. Techniques such as information reconciliation can be used to resolve small discrepancies in the shared bit values of the transmitter and receiver.

The theoretical framework for QC has been established for over 25 years, and its advantages in terms of security of keys are well accepted. Over the past two decades, implementations of QKD systems have become cheaper, more reliable, easier to maintain (e.g., self-tuning, self-checking), and easier to use. Previous QKD devices and technologies do not address certain practical problems of message authentication, however.

In particular, many infrastructure systems have stringent requirements in terms of information assurance (high level of security) and latency (low delay). Examples of such systems include electric grid systems, water systems, industrial control systems and high-speed financial trading systems. Typically, communications in such systems are expected to be provided with assurances of authenticity, confidentiality (e.g., for defense in depth, or to deny competitors access to information that could have trading value), non-repudiation (to prevent a sender from denying it sent a message) and freshness (to protect against replay of messages that disrupts or attacks a system). Moreover, such assurances are expected to be provided without exceeding tight latency constraints.

These security and latency requirements are challenging to satisfy using conventional non-quantum approaches to cryptography or existing QKD approaches. Conventional approaches to cryptography can provide message receivers with assurances about authenticity of the origin of multicast messages in order to protect against impersonation, substitution or replay attacks. In the context of many infrastructure systems, however, it is difficult to concurrently satisfy expectations for security and latency. For example, although appending a message authentication code tag to a message using a pre-shared group key may be sufficiently fast, it would be vulnerable to compromise of a single node. As another example, for public key cryptography, computations are too time-consuming when implemented on typical processors. Authentication with symmetric key cryptography and keyed message authentication code tags has latency problems associated with buffering of a message to determine the tag at the transmitter and hold-back of the message at the receiver to confirm the tag.

SUMMARY

The disclosure described herein relates to message authenticators for quantum-secured communications. The message authenticators can facilitate low-latency authentication with assurances of security. Low-latency message authenticators are especially valuable in infrastructure systems where security and latency constraints are difficult to satisfy with conventional non-quantum cryptography.

According to some aspects described herein, a message transmitter receives a message. The message transmitter derives an authentication tag for the message based at least in part on an authenticator that uses one or more quantum keys. The authenticator can use stream-wise operations, such that buffering of all of the message is not required to derive the authentication tag, and such that messages can have variable length. In some example implementations, the authenticator includes cyclic redundancy code (CRC) operations. In other example implementations, the authenticator includes hashing operations with Toeplitz matrices. The message transmitter outputs the message and its authentication tag.

According to some aspects, a message receiver receives a message and an authentication tag for the message. The message receiver derives a comparison tag for the message based at least in part on an authenticator that uses one or more quantum keys. The authenticator can use stream-wise operations, such that buffering of all of the message is not required to derive the comparison tag, and such that messages can have variable length. In some example implementations, the authenticator includes CRC operations. In other example implementations, the authenticator includes hashing operations with Toeplitz matrices. The message receiver checks whether the message is authentic based on a comparison of the authentication tag and the comparison tag.

According to some aspects, for each of multiple messages, a message transmitter receives the message and derives an authentication tag for the message. The authentication tag is based at least in part on an authenticator that uses one or more quantum keys. The message transmitter selects one of multiple data streams that are multiplexed over a single fiber connection to support multi-level security, then outputs the message and the authentication tag as part of the selected data stream. At least some different quantum keys are used in the authenticator for different messages in different data streams.

According to some aspects, for each of multiple messages, a message receiver receives the message and its authentication tag as part of one of multiple data streams that are multiplexed over a single fiber connection to support multi-level security. The message receiver derives a comparison tag for the message based at least in part on an authenticator that uses one or more quantum keys. The message receiver checks whether the message is authentic based on a comparison of the authentication tag and the comparison tag. At least some different quantum keys are used in the authenticator for different messages in different data streams.

The message authenticators for quantum-secured communication can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

DETAILED DESCRIPTION

Figure 1:
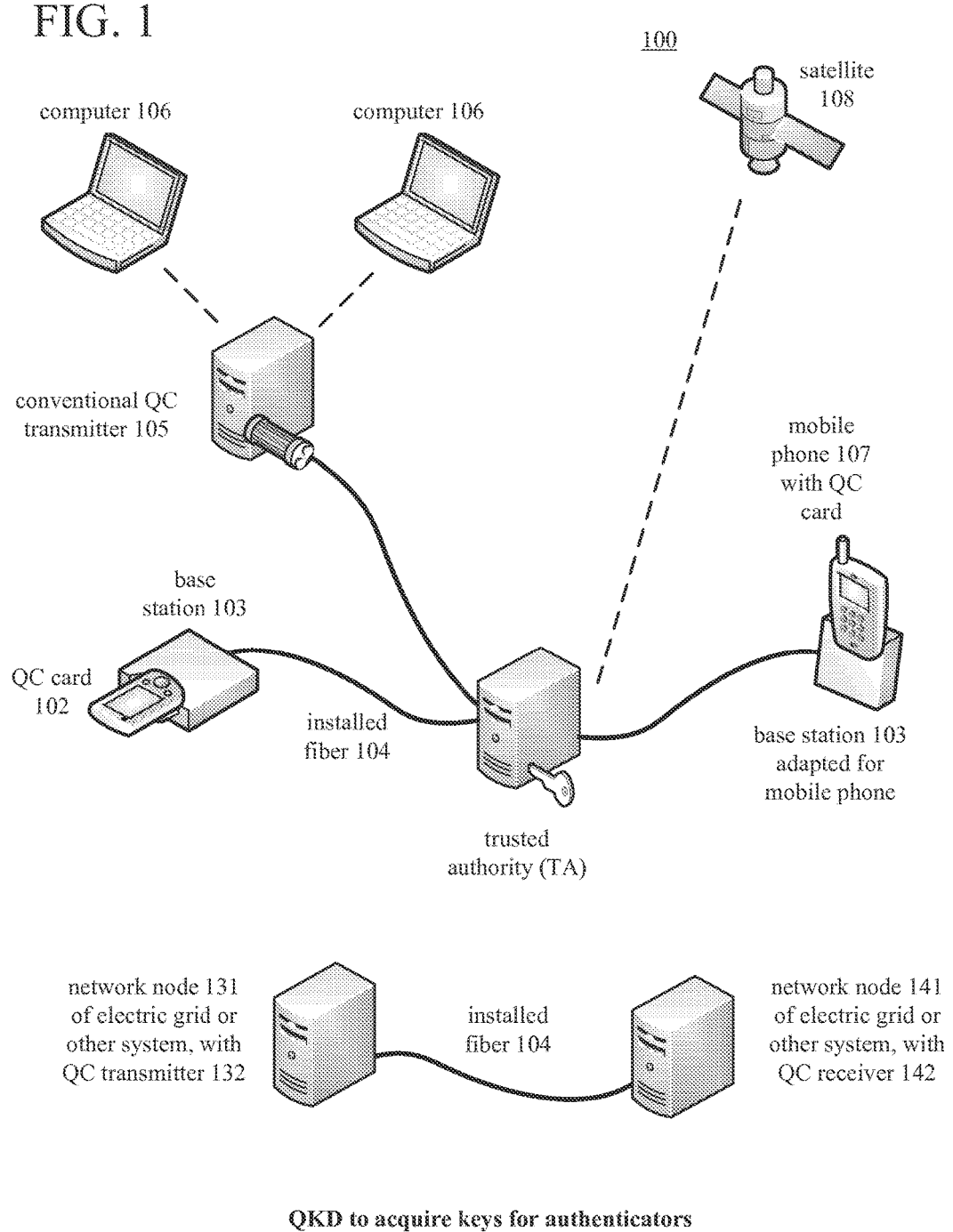
FIG. 1 is a diagram of an example operating environment in which keys for use in message authenticators are acquired through QKD.

Message authenticators for quantum-secured communications facilitate low-latency authentication with assurances of security. The message authenticators can be used in conjunction with low-latency encryption of streams of packets or frames of data (generally, "messages"), and can also be used in conjunction with digital signatures for the messages. Low-latency message authenticators are especially valuable in infrastructure systems where security and latency constraints are difficult to satisfy with conventional non-quantum cryptography.

Message authenticators described herein use quantum keys. In some example implementations, key management functions are contained within a quantum-secured communications system and do not require user involvement or maintenance. In such a system, downtime to apply security updates can be avoided. Also, message authenticators for quantum-secured communications provide forward security. Quantum keys do not depend on any pre-placed secret key, and they are not subject to conventional attacks, nor are they vulnerable to future advances that exploit increased computing power or flaws discovered in key generation algorithms.

In some example implementations, low-latency message authenticators for quantum-secured communications facilitate multi-level security with multiplexing of several data streams of authenticated messages over a connection.

Message authenticators described herein are computationally lightweight and relatively fast, and can be implemented in hardware relatively efficiently. This makes the message authenticators especially suitable for use in devices with constrained resources such as handheld consumer devices, network nodes in an infrastructure system or devices in the "Internet of things."

Message authenticators described herein can be used in various systems for secure communications. For example, the message authenticators can be used in an electric grid, e.g., in supervisory control and data acquisition ("SCADA") systems, for sub-station communications between intelligent electronic devices such as protective relays, and/or for communications between phasor measurement units ("PMUs") and phasor data concentrators ("PDCs"). Or, the message authenticators can be used in other systems with expectations of high security and low latency, e.g., energy delivery systems, water systems, industrial control systems with programmable logic controllers and high-speed financial trading systems. More generally, message authenticators described herein can be used in systems with expectations of high security even if low latency is not a requirement, e.g., securing enterprise networks or providing consumer services in secure ways.

Unless the context clearly indicates otherwise, operations described herein are implemented with and performed by computing systems. For example, description of transmission of information to a user, determination of a value, and receipt of information from a user generally indicate operations with a computing system associated with the user. On the other hand, description of user input or biometric input to a user device implies a human user providing such input.

In addition, the terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose computer hardware with software implementing the functionality described herein. The term "user device" generally indicates a computing system associated with a user.

Various alternatives to the implementations described herein are possible. Certain techniques described with reference to flowchart diagrams can be altered by changing the ordering of stages shown in the flowcharts, by splitting, repeating or omitting certain stages, etc. Different aspects of the message authenticators described herein can be used in combination or separately. Different embodiments implement one or more of the described techniques and tools. Some of the techniques and tools described herein address one or more of the problems noted in the background. Typically, a given technique/tool does not solve all such problems.

I. Example Operating Environments.

FIG. 1 shows example operating environments (100) in which keys for use in message authenticators are acquired through QKD. In the top part of FIG. 1, various user devices acquire keys through QKD with a trusted authority (101). The user devices include a QC card (102) that couples with a base station (103), a mobile phone (107) that has a QC card, a satellite (108), and several computers (106) connected to a conventional QC transmitter (105). A user device can be for an individual user or for a business, financial institution or government institution as user.

A computing system implements the trusted authority (101). The trusted authority (101) authenticates a user, produces quantum keys in communication with a user device (or conventional QC transmitter (105)), and stores the quantum keys. When the QC card (102) and trusted authority (101) engage in QC, depending on implementation, the QC card (102) and trusted authority (101) can use features such as decoy states, privacy amplification and/or error correction to provide practical benefits. At some point, the trusted authority (101) performs QKD with different devices, and the trusted authority (101) stores quantum keys produced in the different QKD sessions. Thus, with reference to conventional roles for certain cryptographic protocols, the trusted authority (101) can generally act as a key distribution center (by generating/distributing quantum keys to user devices) and key translation center (by maintaining a database of quantum keys and other information used for QKD, and responding to requests for such information). Using quantum keys and other information provided by the trusted authority (101), a given user device can securely communicate with other user devices that have quantum keys from QKD with the trusted authority (101) or otherwise have established a trust relationship with the trusted authority (101).

The QC card (102) contains a miniaturized QC transmitter. The QC card (102) couples with a base station (103), which provides a network connection with the trusted authority (101) and can provide electric power to the QC card (102). Example implementations for a base station (103), QC card (102), and trusted authority adapted for QKD with a QC card (102) are detailed in PCT Patent Application No. PCT/US2011/054061, filed Sep. 29, 2011, which has been published as WO 2012/044852. Whereas conventional QKD solutions have tended to be expensive and difficult to deploy, example implementations of the QC card (102) and base station (103) are relatively inexpensive. A QC card (102) is easily carried, and quantum keys generated with QKD facilitate security that is stronger than that provided with conventional non-quantum key distribution.

The trusted authority (101) can generate one-time digital signature keys as well as verification information for the digital signature keys. The trusted authority transmits such verification information to the QC card (102), for later use in verifying messages from the trusted authority (101). For a different user and QC card, the trusted authority is expected to generate different verification information. The QC card (102) can generate its own one-time digital signature keys and verification information for its digital signature keys, and then transmit such verification information to the trusted authority (101), for later use in verifying messages from the user of the QC card (102). PCT Patent Application No. PCT/US2012/053467, published as WO 2013/048674, describes digital signature keys and verification information that can be used in example implementations.

In FIG. 1, the base station (103) is connected to the trusted authority (101) over installed fiber (104). The installed fiber (104) is used as a quantum channel for point-to-point QKD between the QC card (102) and trusted authority (101), for example, for transmission of photons encoded with quantum state information. The point-to-point QKD can happen over a single optical span or multiple spans in a fiber network whose topology supports QKD. For example, the topology includes intermediate routers between the QC card and trusted authority, but the routers preserve quantum state information. In FIG. 1, the installed fiber (104) is also used as a public channel to exchange non-quantum information between the QC card (102) and trusted authority (101), for example, non-quantum information about measuring bases in the QKD and/or non-secret key information from the trusted authority (101). Alternatively, the QC card (102) and trusted authority (101) communicate non-quantum information over another type of network media (e.g., copper, RF) or free space (optical), or over a fiber network having another network topology.

In one use scenario, a business purchases QC cards (102) for its employees and purchases one or more base stations (103) located at its facilities. An employee periodically plugs the employee's QC card (102) into a base station to load up on quantum keys. The QC card (102) can also receive verification information for digital signature keys, or generate digital signature keys and verification information. The employee can then use the quantum keys for activities such as purchasing over the Internet, authentication or access control at a remote site.

The mobile phone (107) includes a QC card (102) as well as conventional mobile phone components. The mobile phone (107) couples with a base station (103) that is adapted to connect to the mobile phone (107) and provides a network connection to the trusted authority (101). The mobile phone's base station (103) can also provide electric power and a data connection for synchronization of information on the mobile phone (107). The mobile phone (107) stores quantum keys produced by the QC card and trusted authority (101) (e.g., in a QKD process). The mobile phone (107) can also generate digital signature keys (and corresponding verification information), and receive and store verification information from the trusted authority (101).

As shown in FIG. 1, the trusted authority (101) can also produce quantum keys for devices other than a QC card (102), and generate digital signature keys (and verification information) for such other devices. For example, the trusted authority (101) performs QKD to distribute quantum keys to a low-orbit satellite (108) using equipment for QC transmission and reception through free space. Or, the trusted authority (101) performs QKD with a conventional QC transmitter (105), which directly conveys the quantum keys produced by QKD to a locally connected computer (106) at a secure facility. The conventional QC transmitter (105) can connect to the trusted authority (101) over installed fiber (104) (e.g., standard fiber for telecommunications in a building, FTTx link, metro area, etc.) or free space (e.g., rooftop to rooftop, airplane to ground, ship to ship, satellite to ground).

In any case, the QKD produces cryptographic-quality secret random numbers, which can be used as quantum keys for message authentication, encryption, secure multi-party audio or video communication, bank transactions, facility access control, access control for a computing system or database, access control for an online control system, vehicle access, digital signatures, e-voting, tele-presence or another application. As random numbers, the quantum keys have forward secrecy. The quantum keys do not depend on any pre-placed secret key, and they are not subject to conventional attacks, nor are they vulnerable to future advances that exploit increased computing power or flaws discovered in key generation algorithms. Some of the quantum keys produced by QKD can be used for user authentication and other set-up operations before subsequent QKD sessions, so that such set-up operations are automatic and seamless to the user.

In the examples shown in FIG. 1, the computing system that implements the trusted authority (101) has a QC receiver. Alternatively, the computing system that implements the trusted authority (101) has a QC transmitter, and the other party to QKD includes a QC receiver.

Figure 4:
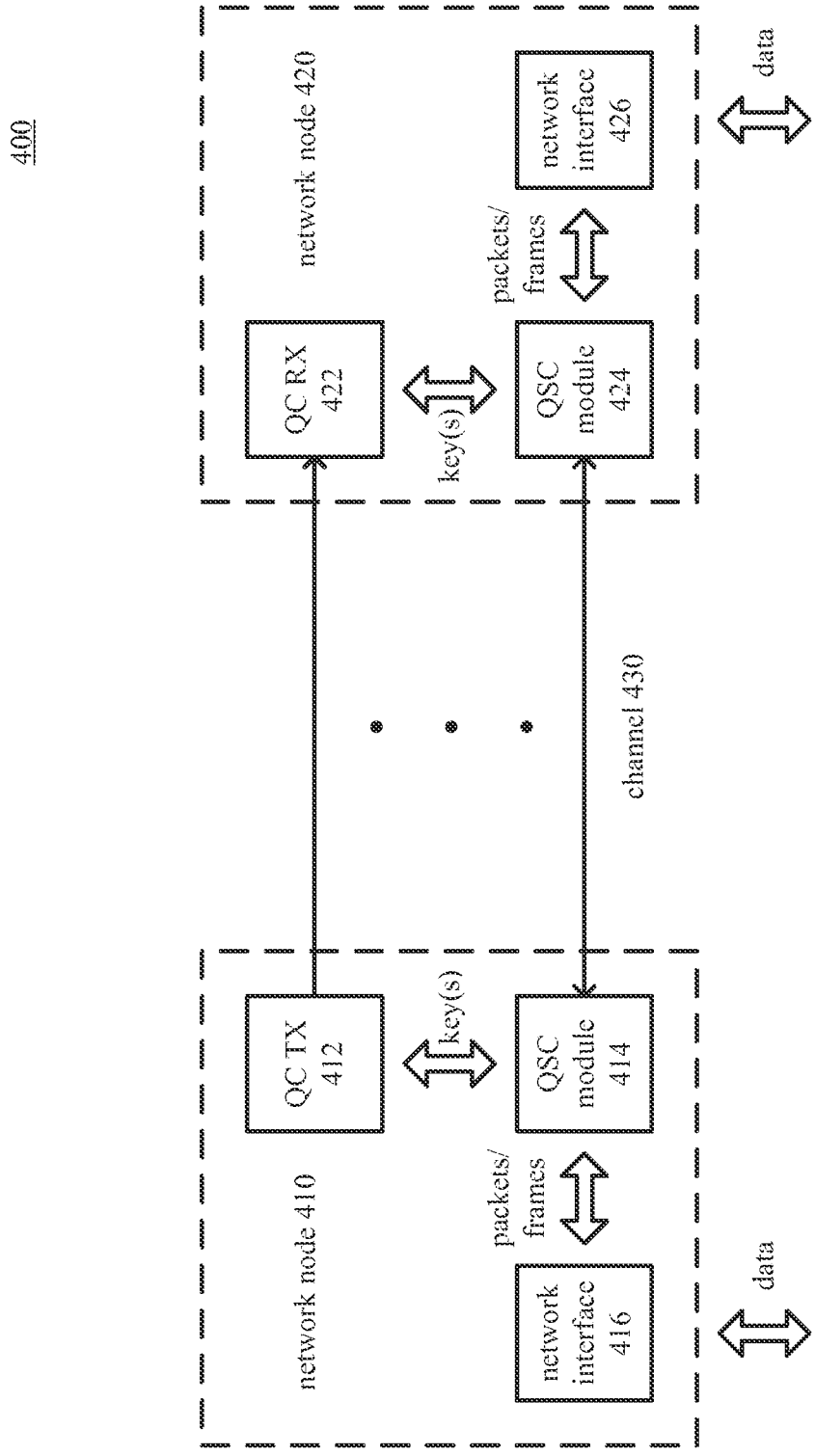
FIG. 4 is a diagram of two network nodes that use quantum-secured communications in an electric grid or other infrastructure system.

The bottom part of FIG. 1 shows network nodes (131, 141) that acquire keys for use in message authenticators through QKD with each other. The keys can also be used for message encryption. The network nodes (131, 141) can also generate digital signature keys (and corresponding verification information), and receive and store verification information from another node. The network nodes (131, 141) are part of an electric grid or other infrastructure system. The network node (131) includes a QC transmitter (132) that can be a QC card or conventional QC transmitter. The network node (141) includes a QC receiver (142). When the network nodes (131, 141) engage in QC, quantum keys are produced and stored. Depending on implementation, the QC transmitter (132) and QC receiver (142) can use features such as decoy states, privacy amplification and/or error correction to provide practical benefits. FIG. 4 shows details of the network nodes (131, 141) in some example implementations.

Aside from the two network nodes (131, 141), the system can include additional network nodes (not shown) in communication with each other and/or the network nodes (131, 141) shown in FIG. 1. In FIG. 1, the network nodes (131, 141) connect over installed fiber (104). The installed fiber (104) is used as a quantum channel for point-to-point QKD between the QC transmitter (132) and QC receiver (142). The point-to-point QKD can happen over a single optical span or multiple spans in a fiber network whose topology supports QKD. In FIG. 1, the installed fiber (104) is also used as a public channel to exchange non-quantum information between the network nodes (131, 141). Alternatively, the network nodes (131, 141) communicate non-quantum information over another type of network media (e.g., copper, RF) or free space (optical), or over a fiber network having another network topology.

Figure 2:
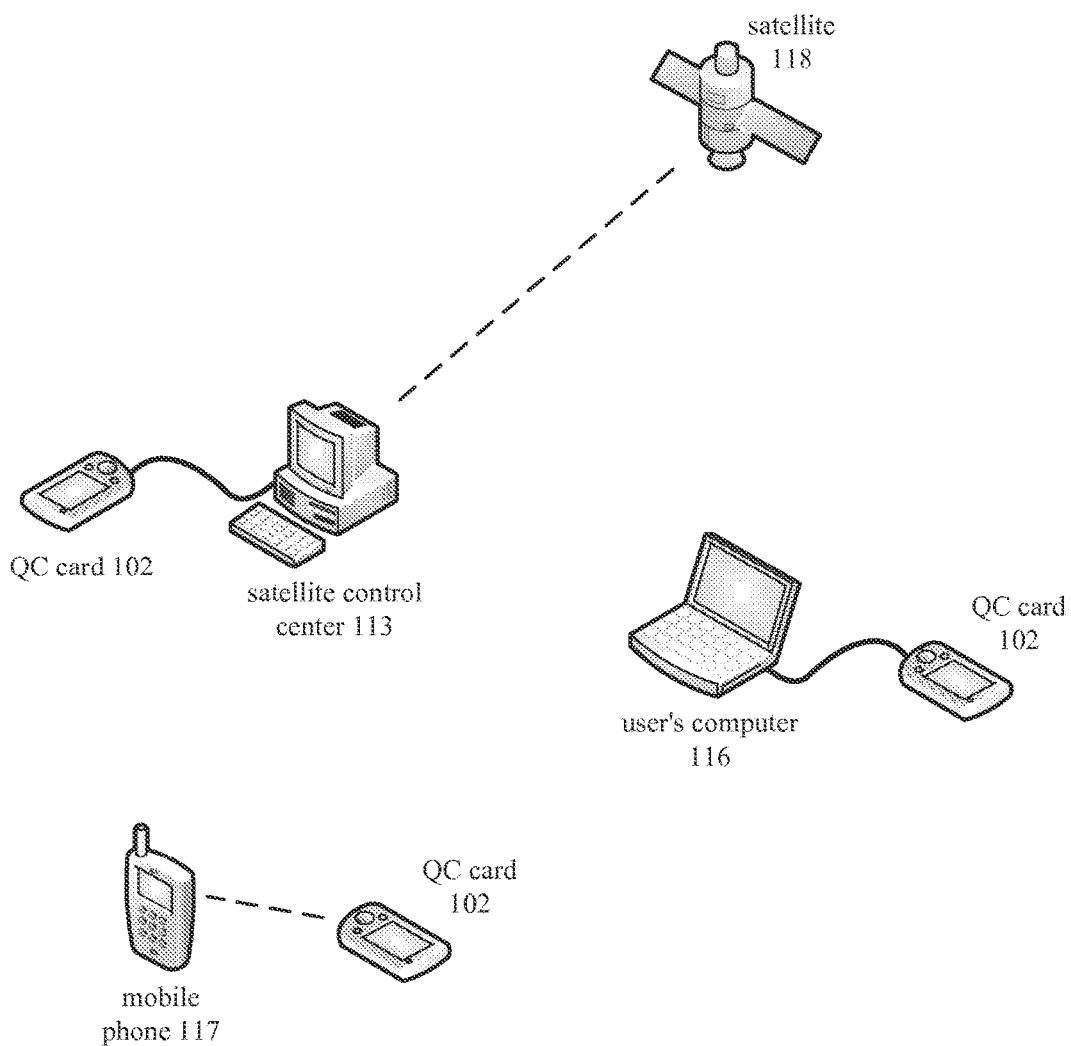
FIGS. 2 and 3 are diagrams of example operating environments in which keys are disseminated and used in message authenticators.

FIG. 2 shows an example operating environment (200) in which a QC card (102) further distributes quantum keys obtained through QKD with the trusted authority (101). A QC card (102) can distribute stored quantum keys to a mobile phone (117) or a user's computer (116). For example, the QC card (102) transmits the quantum keys over a point-to-point fiber connection or wireless connection. Or, a QC card (102) provides quantum keys to a satellite control center (113), which uploads the quantum keys to a satellite (118). The QC card (102) can similarly distribute digital signature keys it has generated and/or verification information it has received.

In this way, the QC card (102) can be used as a "fillgun" to load quantum keys (as well as digital signature keys and/or verification information) from its secure memory into a remote encryptor on a spacecraft, naval vessel or other vehicle. For example, the QC card (102) loads up with quantum keys (as well as digital signature keys and/or verification information) while coupled with a base station at a terminal, is carried to a spacecraft before launch, and then loads the quantum keys (as well as digital signature keys and/or verification information) onto a computing device aboard the spacecraft. The computing device aboard the spacecraft can then use the quantum keys for secure communication with the terminal or another device.

Figure 3:
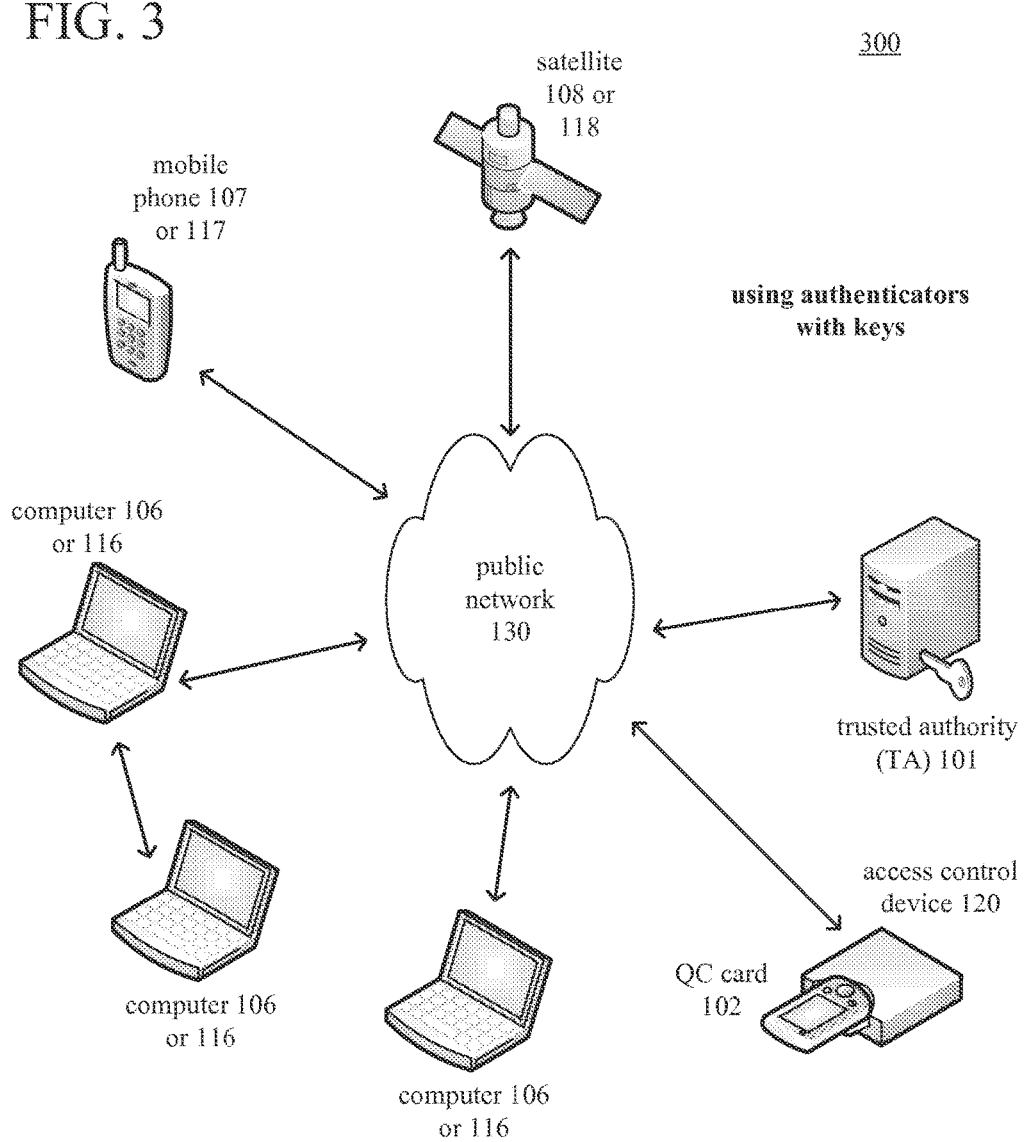
Figure 3:
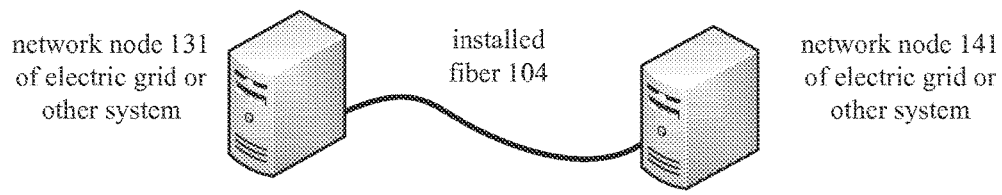

FIG. 3 shows example operating environments (300) in which quantum keys distributed through QKD are used for message authentication. The keys can also be used for message encryption or other applications. As shown in the top part of FIG. 3, with one or more quantum keys and information provided by the trusted authority (101), a user device can securely communicate with another user device directly or over a public network (130) such as the Internet. Or, the user device can use a quantum key to authenticate a message to another user device. Or, the user device can use a quantum key to gain access to a facility through an access control device (120). Within the network of user devices that have each received quantum keys from QKD with the trusted authority (101), one user device can establish a secure connection with any other user device without QKD between the two user devices.

The trusted authority (101) can use one of its previously generated digital signature keys to sign a message to a user device, which can in turn use previously received (or recently gathered, e.g., in real time over the Internet from the trusted authority (101)) verification information to verify the identity of the trusted authority (101). A user device can use one of its previously generated digital signature keys to sign a message to another user device. The other user device can use previously received verification information to verify the identity of the first user device, or it can request such verification information from the trusted authority (101). In this role, the trusted authority (101) can verify the credentials of a user at various stages before distributing information regarding the user, to verify that credentials for the user have not been revoked.

A user device shown in FIG. 3 can acquire its quantum keys through any form of QKD with the trusted authority (101). Some of the user devices shown in FIG. 3 acquired quantum keys directly through QKD with the trusted authority (101), as illustrated in FIG. 1. For example, the mobile phone (107) and QC card (102) acquired quantum keys from QKD with the trusted authority. The user computers (106) acquired quantum keys directly from a local connection to a conventional QC transmitter with a QKD link to the trusted authority. Other user devices shown in FIG. 3 acquired quantum keys from a QC card, as shown in FIG. 2. For example, the satellite (118), mobile phone (117) and user computers (116) acquired quantum keys from a QC card (102). In any case, a user device can use its quantum keys at a location different than the location at which the quantum keys were distributed to the user device. Similarly, digital signature keys can be generated at a device or conveyed to the device, and verification information can be received at a device or conveyed to the device.

The trusted authority (101) is both a QC node (as in FIG. 1) and a conventional network contact point. Aside from QKD, acting in the role of a network server, the trusted authority (101) can exchange information using conventional network communication with a user device that acts in the role of a network client. In this way, the user device can receive information that is usable in combination with one of its stored quantum keys to establish a secure connection with another user device. Or, the user device can receive material from the trusted authority (101) that has been encrypted with one of its stored quantum keys. In addition to managing QKD (or performing QKD that is managed by another system), the trusted authority (101) can fill the role of certificate authority (e.g., generally to provide functions of a certificate directory) and registration authority in a Public Key Infrastructure ("PKI"). Likewise, the trusted authority (101) can act as a network client. Alternatively, another system fills the role of certificate authority and/or registration authority.

For example, in operation as a message transmitter, a user device shown in FIG. 3 accepts data for a message and encrypts the message. For some types of encryption, the encryption is performed stream-wise, without buffering of an entire message. The user device also authenticates the message using a message authenticator. For one-time authentication, each message (e.g., packet, frame) uses a different authenticator. For some types of authentication, the authentication is performed stream-wise, without buffering of an entire message. Examples of message authenticators used by a message transmitter are detailed below. The user device can also digitally sign the message before the message is transmitted. For one-time digital signatures, each message (e.g., packet, frame) is digitally signed with a different digital signature.

In operation as a message receiver, another user device shown in FIG. 3 verifies the digital signature of the message (if signed) and checks the authentication tag of the message using a message authenticator. For some types of authentication, the authentication is performed stream-wise, without holdback of an entire message. Examples of message authenticators used by a message receiver are detailed below. If the message is authenticated, the user device decrypts the data using a decryption algorithm that is appropriate considering the type of encryption used. For some types of decryption, the decryption is performed stream-wise, without holdback of an entire message.

The bottom part of FIG. 3 shows network nodes (131, 141) that use quantum keys in message authenticators. The keys can also be used for message encryption or other applications. The network nodes (131, 141) are part of an electric grid or other infrastructure system. FIG. 4 shows details of the network nodes (131, 141) according to some example implementations, and operations of the network nodes (131, 141) are described with reference to FIG. 4. A network node (131, 141) shown in FIG. 3 can acquire its quantum keys through QKD with another network node or in some other way. Aside from the two network nodes (131, 141), the system can include additional network nodes (not shown) in communication with each other and/or the network nodes (131, 141) shown in FIG. 3. In FIG. 3, the network nodes (131, 141) connect over installed fiber (104), which is used as a public channel to exchange non-quantum information between the network nodes (131, 141). Alternatively, the network nodes (131, 141) communicate non-quantum information over another type of network media (e.g., copper, RF) or free space (optical), or over a fiber network having another network topology.

Quantum keys can facilitate secure communication even when the quantum keys are not used for algorithmic encryption. If two user devices have the same quantum keys, a first user device can use stored quantum keys to determine patterns to spread information content between wavelengths and/or time slots of a signal, then spread the information according to the patterns in transmission. The second user device determines the patterns from the stored quantum keys and de-spreads the information content from the signal it receives. The patterns depend on the stored quantum keys, but security is provided at the physical layer in transmission, not through use of the stored quantum keys in encryption.

II. Example Network Nodes in Electric Grid or Other System.

FIG. 4 is a diagram depicting network nodes (410, 420) that use quantum-secured communications in a system (400). The system (400) can be part of an electric grid. For example, the network nodes (410, 420) can be part of a serial SCADA system for an electric grid. Or, the network nodes (410, 420) can be associated with sub-stations for protective relays in an electric grid. Or, the network nodes (410, 420) can be associated with a PMU and PDC in an electric grid. Or, the network nodes (410, 420) can be part of another type of system (400), e.g., energy delivery system, water system, industrial control system or high-speed financial trading system.

In the system (400), the network node (410) includes a QC transmitter (412), quantum-secured communications ("QSC") module (414) and network interface (416). The network node (420) includes a QC receiver (422), QSC module (424) and network interface (426). The QC transmitter (412) and QC receiver (422) engage in QC to acquire quantum keys, for example, using QKD as described in WO 2012/044852. The QSC modules (414, 424) are classical optical transceivers that use keys established through QKD for authentication of messages (e.g., packets/frames of data). Messages can be conveyed via network interface (416, 426) to other components. Messages can be exchanged in a single direction or bi-directionally between QSC modules (414, 424). The messages can be encrypted using quantum keys established through QKD. A message can be any type of data, organized as the payload of a packet or frame, or organized in some other way.

The network nodes (410, 420) exchange information over a channel (430) that includes a quantum channel and public channel. Quantum traffic between the QC transmitter (412) and QC receiver (422) can be transmitted over one optical fiber, while non-quantum traffic between QSC modules (414, 424) is exchanged over another optical fiber. Or, the quantum traffic and non-quantum traffic can be wavelength multiplexed over a single optical fiber.

In operation, the network node (410) accepts data for a message via network interface (416), formats the data as a packet (e.g., TCP/IP packet) or frame (e.g., serial SCADA frame), and encrypts the message using the QSC module (414). For some types of encryption, the encryption is performed stream-wise, without buffering of an entire message. For example, encryption of the message is performed using a stream cipher, with a key stream expanded from a shared, frequently updated quantum key by the ANSI X9.31 algorithm into a cryptographic random bit string. Alternatively, another type of encryption (e.g., a symmetric key encryption algorithm such as AES) is used.

The QSC module (414) also authenticates the message using a message authenticator. For one-time authentication, each message (e.g., packet, frame) uses a different authenticator. For some types of authentication, the authentication is performed stream-wise, without buffering of an entire message. Examples of message authenticators used by a message transmitter are detailed in the next section.

The QSC module (414) can also digitally sign the message before the message is transmitted over the channel (430). For one-time digital signatures, each message (e.g., packet, frame) is digitally signed with a different digital signature. Examples of computationally fast one-time digital signatures are described in WO 2013/048674.

At the network node (420), the QSC module (424) verifies the digital signature of the message (if signed) and checks the authentication tag of the message using a message authenticator. For some types of authentication, the authentication is performed stream-wise, without holdback of an entire message. Examples of message authenticators used by a message receiver are detailed in the next section.

If the message is authenticated, the QSC module (424) decrypts the data using a decryption algorithm that is appropriate considering the type of encryption used. For some types of decryption, the decryption is performed stream-wise, without holdback of an entire message. Finally, the QSC module (424) conveys the decrypted data to the network interface (426) for output.

Aside from the two network nodes (410, 420), the system (400) can include additional network nodes (not shown) in communication with each other and/or the network nodes (410, 420) shown in FIG. 4. The system (400) is scalable to multi-node networks using a hub-and-spoke topology (e.g., with a trusted authority) as described in PCT Patent Application No. PCT/US2011/054070, which is published as WO 2012/044855.

III. Example Computing Systems.

Figure 5:
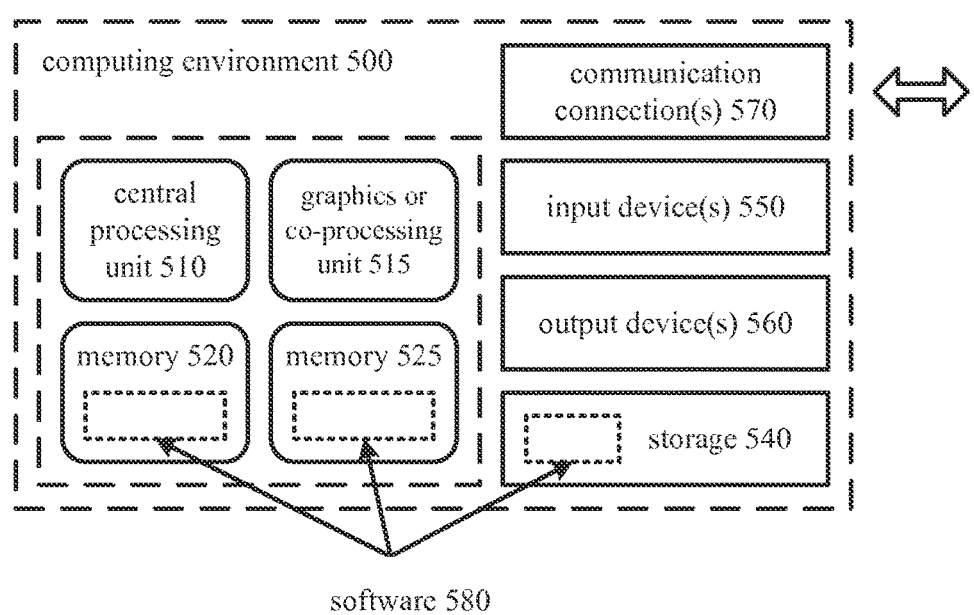
FIG. 5 is a block diagram of an example computing system in which some described embodiments can be implemented.

FIG. 5 illustrates a generalized example of a suitable computing system (500) in which several of the described systems and methods may be implemented. The computing system (500) is not intended to suggest any limitation as to scope of use or functionality, as the disclosure may be implemented in diverse general-purpose or special-purpose computing systems. The computing system (500) can be a user device or network node that uses a message authenticator as described herein.

With reference to FIG. 5, the computing system (500) includes one or more processing units (510, 515) and memory (520, 525). The processing units (510, 515) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 5 shows a central processing unit (510) as well as a graphics processing unit or co-processing unit (515). The tangible memory (520, 525) may be volatile memory (e.g., registers, cache, RAM), non-volatile memory (e.g., ROM, EEPROM, flash memory, etc.), or some combination of the two, accessible by the processing unit(s). The memory (520, 525) stores software (580) implementing message authenticators for quantum-secured communications, in the form of computer-executable instructions suitable for execution by the processing unit(s).

A computing system may have additional features. For example, the computing system (500) includes storage (540), one or more input devices (550), one or more output devices (560), and one or more communication connections (570). An interconnection mechanism (not shown) such as a bus, controller, or network interconnects the components of the computing system (500). Typically, operating system software (not shown) provides an operating environment for other software executing in the computing system (500), and coordinates activities of the components of the computing system (500).

The tangible storage (540) may be removable or non-removable, and includes magnetic disks, magnetic tapes or cassettes, CD-ROMs, DVDs, or any other medium which can be used to store information in a non-transitory way and which can be accessed within the computing system (500). The storage (540) stores instructions for the software (580) implementing message authenticators for quantum-secured communications.

The input device(s) (550) may be a touch input device such as a keyboard, mouse, pen, or trackball, a voice input device, a scanning device, camera, or another device that provides input to the computing system (500). The output device(s) (560) may be a display, printer, speaker, CD-writer, or another device that provides output from the computing system (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In some aspects, the disclosure can be described in the general context of computer-readable media. Computer-readable media are any available tangible media that can be accessed within a computing environment. By way of example, and not limitation, with the computing system (500), computer-readable media include memory (520, 525), storage (540), and combinations of any of the above.

In some aspects, the disclosure can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

IV. One-Time Message Authenticators Using Quantum-Secured Communications.

One-time message authenticators using quantum-secured communications facilitate low-latency authentication with assurances of security. The message authenticators can be used in conjunction with low-latency encryption of streams of packets or frames of data (generally, "messages"), and can also be used in conjunction with digital signatures for the messages. Low-latency message authenticators are especially valuable in infrastructure systems where security and latency constraints are difficult to satisfy with conventional non-quantum cryptography.

A. Theory of Message Authenticators.

Suppose a first user ("user 1") transmits a series of bits (example of message) to a second user ("user 2"). An adversary has access to the communications channel between users 1 and 2. The adversary may attempt to impersonate user 1 and send a false message (purportedly from user 1) to user 2 ("impersonation"). Or, while the message from user 1 is in transit to user 2, the adversary may attempt to alter the message from user 1 ("substitution"). User 2 receives a series of bits, which may or may not correspond to the series of bits sent by user 1.

Users 1 and 2 share a secret authenticator $f$. In many of the examples described herein, the authenticator $f$ is a randomly chosen member of an $\varepsilon$-$ASU_2$ ("almost strongly universal$_2$, with deception probability $\varepsilon$") hash family H. The authenticator maps a-bit input messages to b-bit authentication tags. Suppose A is the set of messages to be authenticated (that is, the set of all a-bit strings), and suppose B is a set of authentication tags (that is, the set of all b-bit strings). An $\varepsilon$-$ASU_2$ hash family is a multi-set of functions H that satisfies the following properties. First, each function in H has domain A and range B. In other words, the function maps a-bit strings to b-bit strings. Second, for any two distinct messages $\alpha_1$, $\alpha_2$ in A, and any two authentication tags $\beta_1$, $\beta_2$ in B (not necessarily distinct), (a) a fraction $1/2^b$ of the functions in H map $\alpha_1$ to $\beta_1$, and (b) of those functions in H that map $\alpha_1$ to $\beta_1$, a fraction at most $\varepsilon$ also map $\alpha_2$ to $\beta_2$.

In general, using an authenticator from an $\varepsilon$-$ASU_2$ hash family H, user 2 can learn whether the received message is equal to the message that user 1 sent, while limiting the adversary's deception probability to at most ε. First, for a message α, user 1 computes an authentication tag β=ƒ(α). User 1 transmits the concatenation α∥β of the message α and tag β to user 2, where "∥" denotes concatenation of bit strings. User 2 receives α'∥β', where the message α' and/or tag β' may have been altered by the adversary. User 2 extracts the tag β' from the received bits and compares the tag with ƒ(α'), which is a tag that user 2 computes for comparison purposes. If the received authentication tag β' matches the computed comparison tag ƒ(α'), user 2 accepts the message α' as authentic (the received message α' matches the transmitted message α).

This approach provides security against impersonation and substitution by the adversary. Suppose the adversary succeeds if the adversary induces user 2 to accept any message α' that is not identical to message α. Because the adversary has no information about the authenticator ƒ, the adversary chooses α' and β' so as to maximize the probability that some authenticator function g (randomly chosen by the adversary from H) yields g(α')=β'. According to property 2(a) of the ε-$ASU_2$ hash family (see above), the probability that g(α')=β' is $P_{d0}=2^{-b}$ for any α' and β'. If the adversary can intercept and replace user 1's transmission on the channel, then the adversary has the option of delaying the attack until user 1 has revealed the tag β=ƒ(α), which leaks some information about ƒ. Nonetheless, according to property 2(b) of the ε-$ASU_2$ hash family (see above), the adversary cannot find another input-tag pair β'=ƒ(α') with α' distinct from α, except with probability $P_{d1}$≤ε. The probability of deception $P_d$ is the probability that user 2 accepts a message for which the adversary has successfully impersonated user 1 or substituted user 1's message. For example, the probability of deception $P_d$ is the higher of the probability of impersonation $P_{d0}$ and the probability of substitution $P_{d1}$. That is, $P_d$=max($P_{d0}$, $P_{d1}$).

If the adversary learns multiple message-tag pairs under the same function ƒ (e.g., $β_1$=ƒ($α_1$), $β_2$=ƒ($α_2$), . . . ), these security assurances no longer apply. One way to limit the adversary's knowledge about the authenticator function ƒ when working with a sequence of multiple messages and tags is to employ a new, randomly chosen secret authenticator ƒ for each message, while denying the adversary any influence over how new authenticators are chosen. The cost in secret key material shared by users 1 and 2 (to choose authenticators) can be prohibitive with key management for conventional non-quantum cryptography, yet acceptable if users 1 and 2 perform QC. Generation of a new authenticator for each message may still be computationally intensive and hence impractical, however.

Another way to limit the adversary's knowledge about the function ƒ when working with a sequence of multiple messages and tags is to re-use part of the authenticator. For each message $α_i$ (for i=0, 1, . . . ) that user 1 wants to authenticate, user 1 computes $β_i$=ƒ($α_i$) as before. User 1 then encrypts β using a b-bit one-time pad ("OTP") key $k_i$, before transmitting the result $β_i$⊕$k_i$. The OTP key $k_i$ is shared with user 2 (e.g., through QKD). Upon receiving an encrypted authentication tag, user 2 applies the OTP key $k_i$ when checking the authentication. The encrypted tags are no easier for the adversary to guess than before. Re-using the basic part of the authenticator ƒ (the part before encryption with the OTP key $k_i$) is secure because the encrypted tags do not reveal any information about the authenticator ƒ to the adversary. Also, the time to generate the basic part of the authenticator ƒ can be amortized over many messages. User 1 and user 2 still expend secret bits to encrypt the authentication tags (for keys $k_i$), but these secret bits can be readily generated using QC between users 1 and 2. In scenarios with multiple pairs of users, different authenticators can be chosen for each pair. By doing so, in the event of a compromise, damage can be contained and the location of the compromise identified.

B. Example Implementations of One-Time Message Authenticators.

In some example implementations, authenticators for different messages reuse part of an authentication function ƒ but apply different OTP keys $k_i$. The authenticators can be used for one-time authentication between a PMU and PDC of an electric grid, in a SCADA system of an electric grid, or in another infrastructure system. The authenticators have a small size, typically increasing overall bandwidth by only a small amount. They use stream-wise operations, avoiding buffering or holdback of a message when determining its authentication tag, and potentially accommodating messages of variable length. The authenticators use cyclic redundancy code ("CRC") operations. As such, they can be efficiently implemented in hardware or software by drawing on CRC tools that have been extensively deployed for the purpose of data integrity checking.

In these example implementations, an authenticator ƒ of the hash family is described by an ordered pair (p, k), where p is an irreducible binary polynomial of degree b, and k is a b-bit string for a quantum key. The authenticator ƒ for message α has the following form:

$$ƒ(α)=\{[α(x)·x^b] \bmod p\}⊕k,$$

where α(x) is a binary polynomial whose coefficients are the bits of the message α. The bits of the message α are shifted to the left by b bit positions. The b-bit shift is introduced by multiplication by $x^b$ and provides security against undetected manipulation of the b low-order bits of the message α. Just as in conventional CRC, the remainder is calculated after division of this polynomial α(x)·$x^b$ by p. The coefficients of the remainder form a b-bit string, which is XOR'd with the key k.

Both p and k are based on secret bits shared by user 1 and user 2, and each of p and k is specified by b secret bits. Users 1 and 2 can determine a new irreducible polynomial p for each new message, but the computational cost of determining the polynomials can be prohibitive. Instead, users 1 and 2 can reuse the same secret polynomial p for authenticating multiple messages, but use a different secret key k for each message. The cryptographic CRC hash family of these example implementations is ε-$ASU_2$ for ε=2(a+b)/$2^b$.

In other example implementations, the authenticators use hashing operations with Toeplitz matrices. The authenticators can be used for one-time authentication between a PMU and PDC of an electric grid, in a SCADA system of an electric grid, or in another infrastructure system. The authenticators have a small size, typically increasing overall bandwidth by only a small amount. They use stream-wise operations, avoiding buffering or holdback of a message when determining its authentication tag, and potentially accommodating messages of variable length.

A Toeplitz authenticator T is an a×b binary matrix (a columns and b rows) in which the first row and column elements are defined by a+b−1 random bits. The a+b−1 random bits are from a quantum key. The Toeplitz authenticator T acts on an a-row vector a of message bits as input, producing a b-row vector of bits (the tag) as output: b-bit tag=T·α. A new Toeplitz matrix T can be generated using a new set of a+b−1 random bits (part of a quantum key) for every new message α. Or, the Toeplitz matrix T in the authenticator can be reused to authenticate many messages by XOR-ing the b-bit tag with a new b-bit secret key k for each message α, where the key k is part of a quantum key. Treating the key k as a b-row vector, the authentication tag for a message M in this case would be:

$$f(\alpha) = (T \cdot \alpha) \oplus k.$$

For a given tag size of b bits, a Toeplitz authenticator has a smaller deception probability ($P_d=2^{-b}$) than a cryptographic CRC authenticator, but requires a much larger number of bits to specify the authenticator: (a+b—1) in the Toeplitz case. If a fresh Toeplitz matrix T is picked for each message, this would require a higher rate of key material than for CRC authenticators. In the matrix T reuse version, however, the secret key cost for the Toeplitz matrix T would be amortized over many messages, and so the Toeplitz authenticator would come close to the efficiency of the CRC authenticator in terms of use of quantum key material.

A Toeplitz authenticator can be efficiently implemented using a linear feedback shift register ("LFSR") that allows it to be applied to a message without holdback or buffering of message bits. This implementation can use fast Toeplitz binary matrix multiplication with finite impulse response ("FIR") filtering as described in section 4.2 of Xu et al., "Fixed-point Analysis and Realization of a Blind Beamforming Algorithm," Proc. SPIE 3807, 188-199 (1999). The Toeplitz authenticator can be implemented in software, FPGA, or ASIC using commonly available LFSR tools.

For additional explanation of the theory behind authenticators using CRC operations, hashing operations with Toeplitz matrices, and LSFRs, see Hugo Krawczyk, "LSFR-based Hashing and Authentication," CRYPTO '94, LNCS 839, pp. 129-139 (1994). The Krawczyk paper generally describes authenticators used in the context of conventional non-quantum cryptography, but it does not address how to adapt the authenticators for quantum cryptography, nor does it address how to generate enough key material to use the authenticators for one-time message authentication in many real-world scenarios.

C. Techniques for Quantum-Secured Communications Incorporating One-Time Authenticators.

Figure 6:
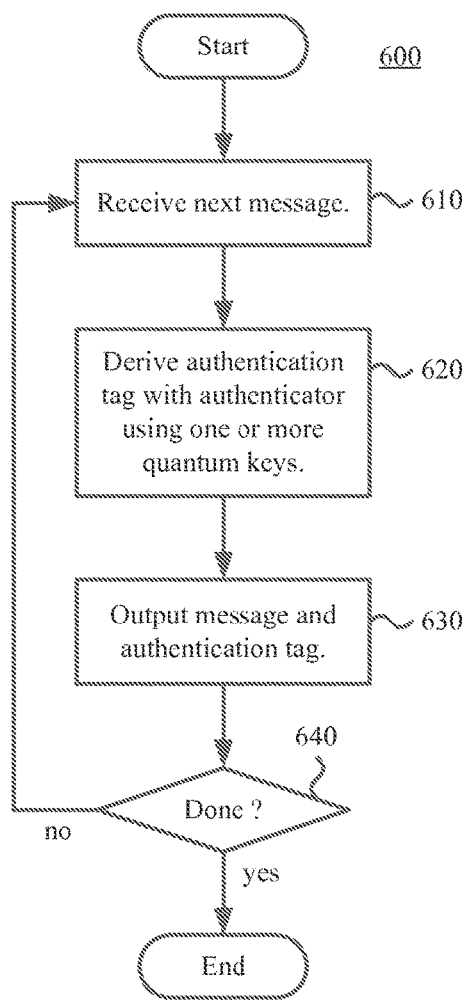
FIGS. 6 and 7 are flowcharts illustrating generalized techniques from the perspective of a message transmitter and message receiver, respectively, for quantum-secured communications using message authenticators.

FIG. 6 shows a generalized technique (600), from the perspective of a message transmitter, for quantum-secured communications using message authenticators. A message transmitter such as a PMU, PDC or other node in an electric grid, a node in a high-speed trading system, a control station in a water management system, a control station in an oil or gas distribution system, or other device can perform the technique (600).

The message transmitter receives (610) a message. For example, the message transmitter receives the message from another module of a computing device. The message can be formatted as a packet or frame, or it can be formatted in some other way. Any type of data can be included in the message. The message can be encrypted or not encrypted.

The message transmitter derives (620) an authentication tag based at least in part on an authenticator that uses one or more quantum keys. The authenticator can include streamwise operations, such that buffering of all of a message is not required to derive its authentication tag, and such that messages can have variable length. Alternatively, the authenticator buffers the message when deriving the authentication tag, or messages have a fixed length.

In some example implementations, the authenticator uses CRC operations. For example, the authenticator is a function $f(\alpha)$ that uses a binary polynomial $\alpha(x)$ based on the message, uses an irreducible binary polynomial p of degree b, and uses a b-bit quantum key k of the one or more quantum keys. Bits of the message can be coefficients of the binary polynomial $\alpha(x)$. The irreducible binary polynomial p can be determined as described with reference to FIG. 10, or it can be determined in some other way. Alternatively, the message transmitter uses a message authenticator with another form. For example, the message authenticator uses hashing operations with Toeplitz matrices.

The message transmitter outputs (630) the message and authentication tag. In doing so, the message transmitter can concatenate the message and its authentication tag as a bit string. For example, the message transmitter outputs the message and authentication tag over a channel such as the Internet. Or, the message transmitter outputs the message and authentication tag over a dedicated connection to the message receiver. The message and authentication tag can be output as part of a data stream on a single fiber connection. Alternatively, the message transmitter outputs the message and authentication tag in some other way.

Derivation (620) of the authentication tag can follow message encryption and use bits of the encrypted message, so as to authenticate the encrypted message. This can be suitable for so-called layer 3 encryption, in which packet headers (e.g., TCP/IP headers) are not encrypted and normal packet routing is used. Alternatively, derivation (620) of the authentication tag can precede encryption of the message and use bits of the unencrypted message. This can be suitable for so-called layer 2 encryption, in which all bits (including packet headers) are encrypted and data flows directly between users. Or, derivation (620) of the authentication tag can use bits of a message that is never encrypted.

The message transmitter checks (640) whether to continue with another message. If so, the message transmitter receives (610) the next message and derives (620) its authentication tag. Quantum keys used for the authenticator can be acquired by QKD that is performed concurrently with message authentication, for example, as described in section V. Alternatively, quantum keys are acquired first, before the message transmitter starts receiving messages and deriving authentication tags.

Figure 7:
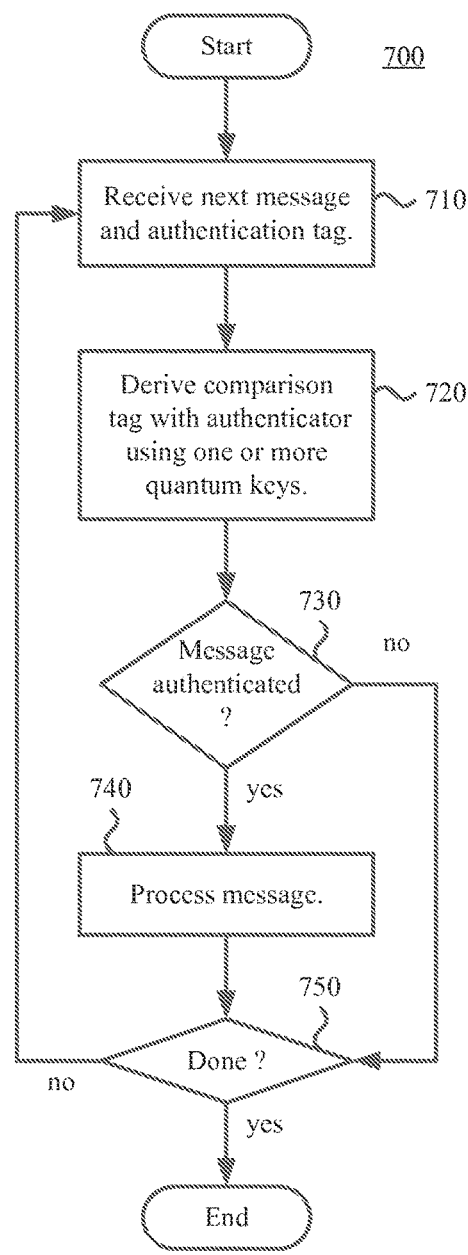

FIG. 7 shows a generalized technique (700), from the perspective of a message receiver, for quantum-secured communications using message authenticators. A message receiver such as a PMU, PDC or other node in an electric grid, a node in a high-speed trading system, a control station in a water management system, a control station in an oil or gas distribution system, or other device can perform the technique (700).

The message receiver receives (710) a message and its authentication tag. For example, the message receiver receives the message and authentication tag over a channel such as the Internet. Or, the message receiver receives the message and authentication tag over a dedicated connection to the message transmitter. The message and authentication tag can be received as part of a data stream on a single fiber connection. Alternatively, the message receiver receives the message and authentication tag in some other way. The message can be formatted as a packet or frame, or it can be formatted in some other way. Any type of data can be included in the message. The message can be encrypted or not encrypted.

The message receiver derives (720) a comparison tag for the message based at least in part on an authenticator that uses one or more quantum keys. The authenticator can include stream-wise operations, such that buffering of all of a message is not required to derive its authentication tag, and such that messages can have variable length. Alternatively, the authenticator buffers the message when deriving the comparison tag, or messages have a fixed length.

In some example implementations, the authenticator uses CRC operations. For example, the authenticator is a function $f(\alpha)$ that uses a binary polynomial $\alpha(x)$ based on the message, uses an irreducible binary polynomial p of degree b, and uses a b-bit quantum key k of the one or more quantum keys. Bits of the message can be coefficients of the binary polynomial $\alpha(x)$. The irreducible binary polynomial p can be determined as described with reference to FIG. 10, or it can be determined in some other way. Alternatively, the message receiver uses a message authenticator with another form. For example, the message authenticator uses hashing operations with Toeplitz matrices.

The message receiver checks (730) whether the message is authentic based on a comparison of the received authentication tag and the comparison tag derived by the message receiver. If the authentication tag matches the comparison tag, the message receiver processes (740) the message. For example, the message receiver provides the message to another module of the device. Otherwise (message not authenticated), the message receiver skips the processing (740).

Derivation (720) of the comparison tag can precede message decryption and use bits of the encrypted message, so as to authenticate the encrypted message. In this case, the message can be decrypted as part of the processing (740) of the message. Alternatively, derivation (720) of the comparison tag can follow decryption and use bits of the decrypted message. Or, derivation (720) of the comparison tag can use bits of a message that is never encrypted.

Whether or not the message is authenticated, the message receiver checks (750) whether to continue with another message. If so, the message receiver receives (710) the next message and its authentication tag, and derives (720) a comparison tag. Quantum keys used for the authenticator can be acquired by QKD that is performed concurrently with message authentication, for example, as described in section V. Alternatively, quantum keys are acquired first, before the message receiver starts receiving messages and deriving tags.

Figure 8:
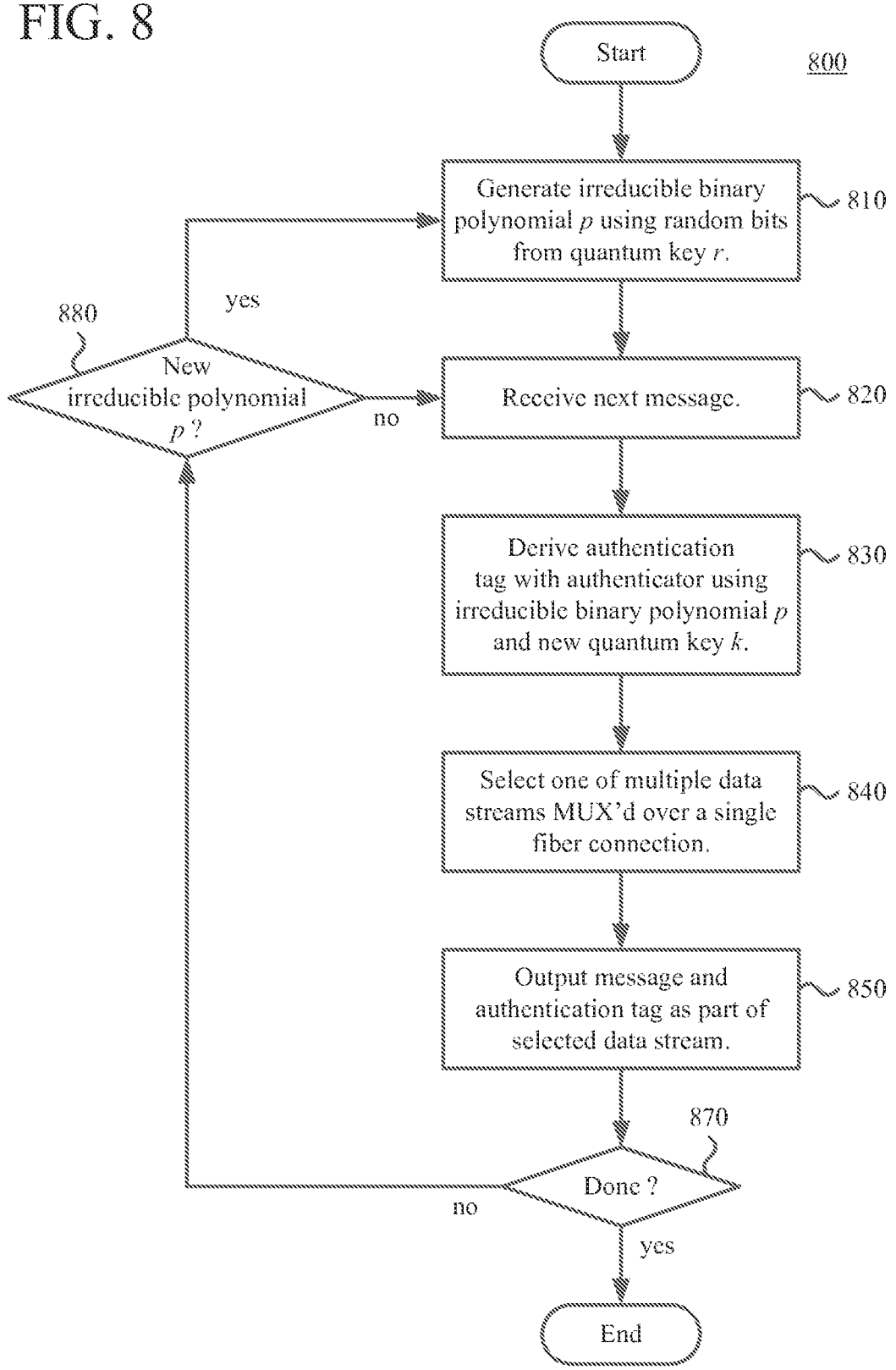
FIGS. 8 and 9 are flowcharts illustrating example techniques from the perspective of a message transmitter and message receiver, respectively, for quantum-secured communications using message authenticators with cyclic redundancy code operations and multi-level security.

FIG. 8 shows an example technique (800), from the perspective of a message transmitter, for quantum-secured communications using message authenticators with CRC operations and multi-level security. A message transmitter such as a PMU, PDC or other node in an electric grid, a node in a high-speed trading system, a control station in a water management system, a control station in an oil or gas distribution system, or other device can perform the technique (800). To support multi-level security on a single fiber connection, the message transmitter can repeat certain intermediate stages of the technique (800) for each of multiple messages, which are output as part of multiple data streams multiplexed on the single fiber connection.

The message transmitter generates (810) an irreducible binary polynomial p using random bits from a quantum key r. The irreducible binary polynomial p can be determined as described with reference to FIG. 10, or it can be determined in some other way.

The message transmitter receives (820) a message. For example, the message transmitter receives the message from another module of a computing device. The message can be formatted as a packet or frame, or it can be formatted in some other way. Any type of data can be included in the message. The message can be encrypted or not encrypted.

The message transmitter derives (830) an authentication tag for the message based at least in part on an authenticator that uses the irreducible binary polynomial p and also uses a quantum key k. For example, the authenticator is a function $f(\alpha)$ that uses a binary polynomial $\alpha(x)$ based on the message, uses the irreducible binary polynomial p (of degree b), and uses a quantum key k (b bits). For one-time authentication, the key k is a new quantum key.

The message transmitter selects (840) one of the multiple data streams that are multiplexed over the single fiber connection. For example, different data streams can be associated with different levels of quality of service ("QOS") or different types of traffic. The message transmitter outputs (850) the message and its authentication tag as part of the selected data stream. For example, the message transmitter concatenates the message and its authentication tag as a bit string, which is output as part of the selected data stream over the single fiber connection.

The message transmitter checks (870) whether to continue with another message. If so, the message transmitter checks (880) whether to generate a new irreducible polynomial p. For one-time authentication with low computational complexity, the message transmitter can reuse the irreducible binary polynomial p in the authenticator for different messages, but use different values of the key k in the authenticator for the different messages. From time to time, however, the message transmitter can generate (810) a new irreducible polynomial. The message transmitter continues by receiving (820) the next message and deriving (830) its authentication tag.

Figure 9:
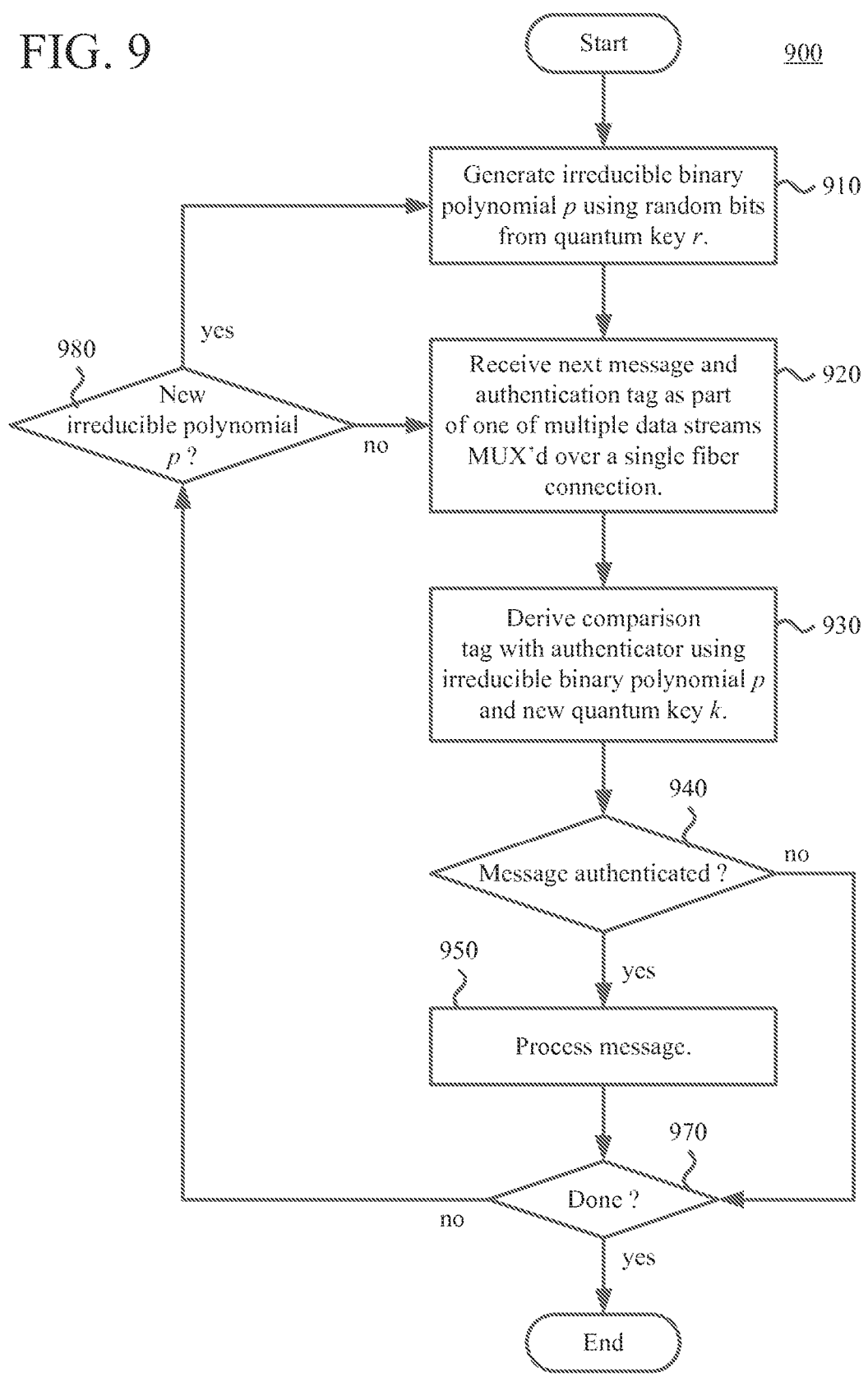

FIG. 9 shows an example technique (900), from the perspective of a message receiver, for quantum-secured communications using message authenticators with CRC operations and multi-level security. A message receiver such as a PMU, PDC or other node in an electric grid, a node in a high-speed trading system, a control station in a water management system, a control station in an oil or gas distribution system, or other device can perform the technique (900). To support multi-level security on a single fiber connection, the message receiver can repeat certain intermediate stages of the technique (900) for each of multiple messages, which are received as part of multiple data streams multiplexed on the single fiber connection.

The message receiver generates (910) an irreducible binary polynomial p using random bits from a quantum key r. The irreducible binary polynomial p can be determined as described with reference to FIG. 10, or it can be determined in some other way.

The message receiver receives (920) a message and its authentication tag as part of one of the multiple data streams multiplexed over the single fiber connection. The message can be formatted as a packet or frame, or it can be formatted in some other way. Any type of data can be included in the message. The message can be encrypted or not encrypted.

The message receiver derives (930) a comparison tag for the message based at least in part on an authenticator that uses the irreducible binary polynomial p and also uses a quantum key k. For example, the authenticator is a function $f(\alpha)$ that uses a binary polynomial $\alpha(x)$ based on the message, uses the irreducible binary polynomial p (of degree b), and uses a quantum key k (b bits). For one-time authentication, the key k is a new quantum key.

The message receiver checks (940) whether the message is authentic based on a comparison of the received authentication tag and the comparison tag derived by the message receiver. If the authentication tag matches the comparison tag, the message receiver processes (950) the message. For example, the message receiver provides the message to another module of the device. The message receiver can also decrypt the message. Otherwise (message not authenticated), the message receiver skips the processing (950).

Whether or not the message is authenticated, the message receiver checks (970) whether to continue with another message. If so, the message receiver checks (980) whether to generate a new irreducible polynomial p. For one-time authentication with low computational complexity, the message receiver can reuse the irreducible binary polynomial p in the authenticator for different messages, but use different values of the key k in the authenticator for the different messages. From time to time, however, the message receiver can generate (910) a new irreducible polynomial. The message receiver continues by receiving (920) the next message and deriving (930) its comparison tag.

D. Generating Irreducible Binary Polynomials Using Quantum Keys.

In some example implementations, a b-bit tag is the remainder after dividing an arbitrary a-bit message (regarded as a degree a polynomial) by a degree b polynomial. The degree b polynomial is an irreducible polynomial, meaning it cannot be written as a product of polynomials of smaller degree. The coefficients of the terms in the polynomial are binary values, and the polynomials are polynomials over the space GF(2). The degree of a polynomial is the highest power of x occurring in the polynomial. For example, $x^4+x^1+1$ is degree 4.

Figure 10:
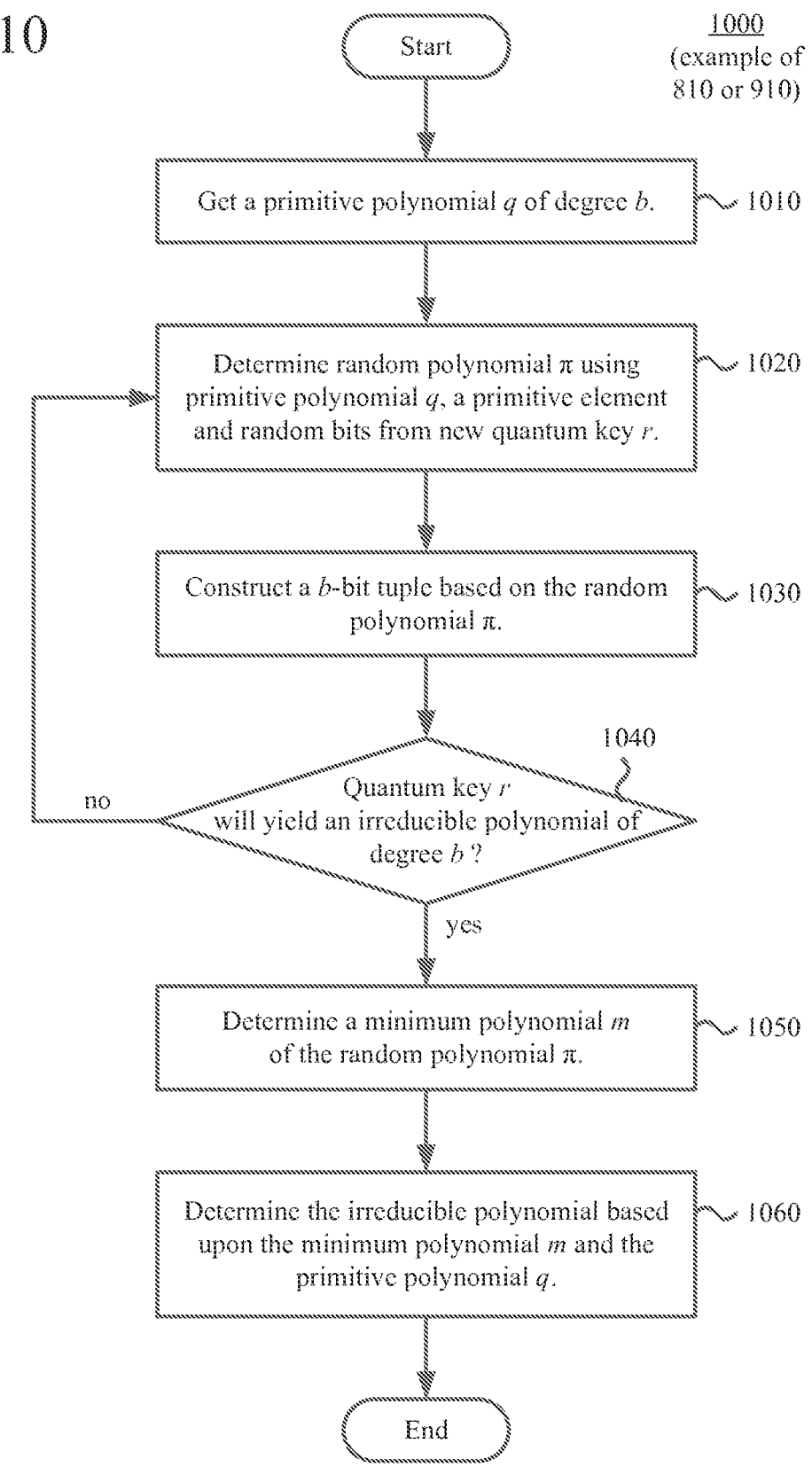
FIG. 10 is a flowchart illustrating an example technique for generating an irreducible binary polynomial to be used in a message authenticator for quantum-secured communications.

FIG. 10 shows an example technique (1000) for generating an irreducible binary polynomial to be used in a message authenticator for quantum-secured communications. A tool such as a PMU, PDC or other node in an electric grid, a node in a high-speed trading system, a control station in a water management system, a control station in an oil or gas distribution system, or other device can perform the technique (1000).

To start, the tool gets (1010) a primitive polynomial q of degree b. For example, the tool picks a degree b primitive polynomial q from a look-up table in response to user input, or user input directly indicates the primitive polynomial q. The table or list of b-degree primitive polynomials can be retrieved from a local database, the World Wide Web or another source. This can be a one-time choice, or the tool can repeat the selecting (1010) from time to time. The primitive polynomial q can be represented as a (b+1)-bit tuple Q.

The tool determines (1020) a random polynomial $\pi$ using the primitive polynomial q, a primitive element and bits from a quantum key r of the one or more quantum keys. For example, the tool gets b random bits representing a random integer R from the quantum key r, and the tool determines a primitive element a of space $GF(2^b)$. Space $GF(2^b)$ has dimension $(2^b-1)$, not $2^b$. The tool raises the primitive element a by the $R^{th}$ power to determine the random polynomial: $\pi=a^R$ mod q. Because $a^0=a^{(2^b)-1}=1$ mod q, and because $\pi=1$ cannot result in a degree b irreducible polynomial, R has a value between 1 and $(2^b-2)$. If R=0 or $(2^b-1)$, the tool gets new random bits for R (from another quantum key) and starts over.

Otherwise (value of R appropriate), the tool constructs (1030) a b-bit tuple based on the random polynomial $\pi$. For example, using the random integer R, the tool constructs as a b-bit tuple $P_0$ the element $\pi=a^R$ mod q of space $GF(2^b)$. This construction can be done efficiently starting from the b-tuple representation of a (A=[0 0 . . . 0 1 0]) using a square-and-multiply method, with intermediate reductions mod q using polynomial division with the (b+1)-bit tuple representation Q of q.

Using the b-bit tuple, the tool checks (1040) whether the quantum key r will yield a b-degree polynomial that cannot be reduced. In particular, the tool checks whether the current value of R will give an irreducible polynomial of degree b, as opposed to a polynomial of lower degree. For k=1, 2 . . . , (b-1), the tool in turn calculates $\pi^{2^k}$ mod q, storing each intermediate result as b-tuple $P_k$ and comparing the result with $P_0$. If $P_k=P_0$ for some k<(b-1), the procedure would give a polynomial of degree smaller than b (failure case). If so, the tool determines a new random polynomial $\pi$ using a different value for R.

Otherwise, the tool determines (1050) a minimum polynomial m of the random polynomial $\pi$. By the properties of minimal polynomials, the minimal polynomial m(x) of $\pi$ has the form $m(x)=(x+\pi)\cdot(x+\pi^2)\cdot(x+\pi^4)\cdot \ldots \cdot(x+\pi^{2^{(b-1)}})$, because of the above selection of R. The tool generates m as a (b+1)-bit tuple, as follows. The tool evaluates m(a) as a b-tuple M by calculating each bracket in the product $M=(A+P_0)\cdot(A+P_1)\cdot \ldots \cdot(A+P_{(b-1)})$, using the $P_k$ values calculated above, multiplying the sums in the brackets, and reducing the product mod q to get the remainder.

Finally, the tool determines (1060) the irreducible polynomial based upon the minimum polynomial m and the primitive polynomial q. For example, the tool produces the (b+1)-bit tuple H representation of m as H=(M+Q) for the irreducible polynomial. Polynomial arithmetic is binary arithmetic mod 2 on the coefficients (e.g., addition is bitwise XOR of coefficients).

For additional details about stages of generating the irreducible polynomial, see (1) Shoup, "Fast Construction of Irreducible Polynomials over Finite Fields," Proc. Fourth Annual ACM-SIAM Symposium on Discrete Algorithms, pp. 484-492 (1993), and (2) Gordon, "Very Simple Method to Find the Minimum Polynomial of an Arbitrary Zonzero Element of a Finite Field," Electronics Letters 12, pp. 663-664 (1976).

For example, to generate a 4-bit authentication tag, the tool finds a random irreducible polynomial of degree 4. That is, the tool finds a random polynomial p of the form $p(x)=x^4+sx^3+tx^2+ux+1$, where s, t, u=0 or 1, that cannot be factored into a product of lower degree polynomials. (The coefficient of $x^0$ is 1, otherwise p would factor into $p(x)=x\cdot v(x)$, with v having degree 3, contradicting the irreducibility of p.)

To start, the tool gets a primitive polynomial q of degree 4. For example, among the two 4-degree primitive polynomials $x^4+x+1$ and $x^4+x^3+1$, the tool selects the primitive polynomial $q(x)=x^4+x+1$, which has the 5-tuple representation Q=10011. The primitive polynomial is irreducible, and so it has no roots over GF(2). It does, however, have roots in the space of polynomials of degree <4, $GF(2^4)$. Any one of these roots is a primitive element of $GF(2^4)$, meaning that any element of $GF(2^4)$ can be expressed as a power of a primitive element.

The following table shows 4-bit tuples $P_0$ for different values of integer R.

| $\pi$ | $P_0$ | $\{\pi, \pi^2, \pi^4, \pi^8\}$ |
|---|---|---|
| $a^0$ | 0001 | $\{a^0, a^0, a^0, a^0\}$ |
| $a^1$ | 0010 | $\{a^1, a^2, a^4, a^8\}$ |
| $a^2$ | 0100 | $\{a^2, a^4, a^8, a^1\}$ |
| $a^3$ | 1000 | $\{a^3, a^6, a^{12}, a^9\}$ |
| $a^4$ | 0011 | $\{a^4, a^8, a^1, a^2\}$ |
| $a^5$ | 0110 | $\{a^5, a^{10}, a^5, a^{10}\}$ |
| $a^6$ | 1100 | $\{a^6, a^{12}, a^9, a^3\}$ |
| $a^7$ | 1011 | $\{a^7, a^{14}, a^{13}, a^{11}\}$ |
| $a^8$ | 0101 | $\{a^8, a^1, a^2, a^4\}$ |
| $a^9$ | 1010 | $\{a^9, a^3, a^6, a^{12}\}$ |

-continued

| π | $P_0$ | $\{\pi, \pi^2, \pi^4, \pi^8\}$ |
|---|---|---|
| $a^{10}$ | 0111 | $\{a^{10}, a^5, a^{10}, a^5\}$ |
| $a^{11}$ | 1110 | $\{a^{11}, a^7, a^{14}, a^{13}\}$ |
| $a^{12}$ | 1111 | $\{a^{12}, a^9, a^3, a^6\}$ |
| $a^{13}$ | 1101 | $\{a^{13}, a^{11}, a^7, a^{14}\}$ |
| $a^{14}$ | 1001 | $\{a^{14}, a^{13}, a^{11}, a^7\}$ |

Using a value of R from the set {5, 10} will not be successful, but using a value of R from any of the sets of values {1, 2, 4, 8}, {3, 6, 9, 12} or {7, 11, 13, 14} will result in successful execution of the algorithm. For example, suppose R=3. The tool calculates the minimum polynomial $m_{a^3}(a)=(a+a^3)\cdot(a+a^6)\cdot(a+a^{12})\cdot(a+a^9)=a^9\cdot a^{11}\cdot a^{13}\cdot a^3$. The value of $a^9 \cdot a^{11} \cdot a^{13} \cdot a^3 = a^6$, by multiplying the polynomials and determining the remainder of the product mod q. After those operations, M=1100. For this case, the hash function H can be represented as a 5-tuple H=M+Q=11111. This indicates the irreducible degree-4 polynomial $x^4+x^3+x^2+x+1$. Using any R within {3, 6, 9, 12} will result in the algorithm outputting the same irreducible polynomial $x^4+x^3+x^2+x+1$.

If R=7, the minimum polynomial is $m_{a^7}(a)=(a+a^7)\cdot(a+a^{14})\cdot(a+a^{13})\cdot(a+a^{11})=a^{14}\cdot a^7\cdot a^{12}\cdot a^6$. The value of $a^{14}\cdot a^7\cdot a^{12}\cdot a^6=a^9$, by multiplying the polynomials and determining the remainder of the product mod q. After those operations, M=1010. In this case, H=M+Q=11001, which indicates the irreducible polynomial $x^4+x^3+1$. Using any R within {7, 11, 13, 14} will result in the algorithm outputting the same irreducible polynomial $x^4+x^3+1$.

If R=1, the minimum polynomial $m_{a^1}(a)=0$, so M=0000. H=M+Q=10011, which indicates the irreducible polynomial $x^4+x+1$, or the primitive polynomial q. Using any R within {1, 2, 4, 8} will result in the algorithm outputting the same irreducible polynomial $x^4+x+1$.

The different values for R can yield one of the three 4-degree irreducible polynomials $x^4+x+1$, $x^4+x^3+1$, and $x^4+x^3+x^2+x+1$. In each case M is even (right most bit is 0), as it must be to give a value H with a rightmost bit of 1 after adding M to Q.

E. Results.

The security parameter ε for authenticators in example implementations depends on message length a as well as authentication tag length b. $\varepsilon=2(a+b)/2^b$. Given the bandwidth of a connection, one can also estimate the expected time $T_d$ at which the cumulative probability of deception (impersonation or substitution) reaches 50%. $T_d=0.5/(P_d \times \text{frame\_rate})$, where frame_rate is the number of messages per second. The following table shows values of ε and $T_d$ for messages transmitted over a 9600-bps serial SCADA link, for two different message lengths and three different tag lengths. The two message lengths are for a typical SCADA message (20 bytes, a=160 bits) and large SCADA message (250 bytes, a=2,000 bits). The three tag lengths are b=16 (2 bytes), b=32 (4 bytes), and b=48 (6 bytes).

| authenticator size (bits) | typical SCADA message (a = 160 bits) | | large SCADA message (a = 2,000 bits) | |
|---|---|---|---|---|
| | deception probability ε | deception time $T_d$ | deception probability ε | deception time $T_d$ |
| b = 16 | $5 \times 10^{-3}$ | 1.5 s | $6 \times 10^{-2}$ | 1.7 s |
| b = 32 | $9 \times 10^{-8}$ | 1.1 days | $9 \times 10^{-7}$ | 1.3 days |
| b = 48 | $10^{-12}$ | 179 years | $10^{-11}$ | 227 years |

With a 6-byte authentication tag, the expected security time is measured in centuries. For short messages (160 bits), up to 60 messages are sent per second over the 9600 bps connection. When QKD is performed concurrently with authentication (see, e.g., section V), to support this level of security, users generate shared secret random bits at a rate of up to 60×48=2.88 kbps in order to produce the OTP keys k used by the authenticators to produce the authentication tags. (The cost of b shared secret bit to generate the random irreducible polynomial p is amortized over many messages, and hence not considered here.) Such QKD rates are readily achievable using QC over optical fiber between users for distances less than about 10 km. Such QKD rates are also achievable using QC over longer distances (up to ~100 km) by using the output of a cryptographic deterministic random number generator whose secret seed value is frequently updated using QC.

V. Example Quantum Secure Communications ("QSC") Systems.

A quantum secure communications ("QSC") system can be deployed as a bump-in-the-wire security retrofit to an existing optical fiber communications link, or as a single-fiber secure communications link. Such a system can be compatible with a variety of established optical fiber communications standards, including, in particular, the widely deployed 1,310-nm 1000Base-LX protocol. In some examples, a QSC system can include plug-and-play interfaces for end device communications using TCP/IP or serial standards such as Supervisory Control and Data Acquisition ("SCADA"), and provide low-latency streaming encryption, authentication, and digital signatures for packet/frame payloads. In the disclosed examples, keys obtained by quantum key exchange are generally shown as used for encryption/decryption, authentication and digital signatures, and some or all of these functions can be provided, as needed. In one example system, total time between encryption and decryption was typically 250 μs, which included ~120 μs of transmission time over a 25 km optical fiber. Key management functions can be entirely self-contained to the QSC system and require no user involvement. Low-latency cryptography is especially valuable for the critical infrastructure sector, where combined security and latency requirements are challenging to meet with conventional approaches. Other application such as high speed trading systems have similarly challenging requirements. Example QSC systems can secure a data bandwidth of at least 100 Mbps over fiber lengths of up to 80 km. A secured bandwidth can be multiplexed between several data streams, so that QSC systems can support multi-level security.

In one application, QSC systems are configured for electrical power grid monitoring and control, and are configured for use with SCADA and a PMU. A PMU can communicate via a standard C37.118 protocol to a QSC system, which then handles key generation, communication and encryption/decryption of the connection over an optical fiber. PDCs can receive and process data from PMUs. Both PMU-to-PDC data and PDC-to-PMU commands were secured across the 25-km optical fiber link using QC.

In some disclosed examples, a QC transmitter and a QC receiver are associated with respective classical optical transceivers. A single optical fiber is coupled so as to carry both quantum and bi-directional classical communications between them. In a particular application, the transmitter node and receiver node eceive TCP/IP packets as input, encrypt the payload of each packet using quantum keys expanded by the ANSI X9.31 protocol, and transmit encrypted TCP/IP packets to their counterpart, where it is decrypted and employed directly. For many applications, user equipment is connected and controlled via a single optical fiber using such packetized data and commands.

Figure 11:
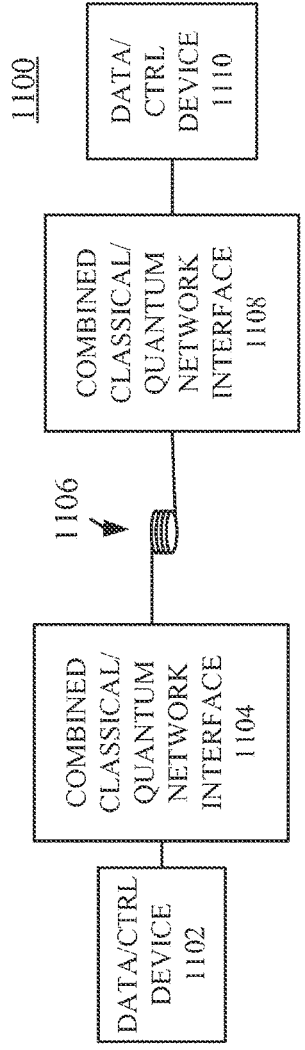
FIG. 11 is a block diagram of a representative communication system that includes quantum security.

With reference to FIG. 11, a communication system (1100) includes a data/control device (1102) such as any of various user data gathering and/or control devices (e.g., PDCs, PMUs). A combined classical/QC network interface (1104) is coupled to communicate via an optical fiber (1106). For long distances, single mode fiber is typically selected to reduce fiber loss, but multimode fiber can be used. The network interface (1104) typically includes a classical transceiver for conventional communications based on amplitude, phase, or frequency modulation of an optical signal. The interface (1104) also includes a QC transmitter (or QC receiver, or both, if desired) configured to communicate QC signals via the fiber (1106). Typically, the QC transmitter encodes based on quantum states that are specially defined properties of photons such as pairs of polarization states (e.g., 0° and 90°, or 45° and 135°) or circular basis states (e.g., left-handedness and right-handedness). The pairs of states form conjugate bases, and states within each pair (i.e., within a particular basis) are orthogonal to the other state from the same basis. Using such states, a transmitter and receiver can produce a shared random series of bits known only to the transmitter and receiver, which can then be processed for use as secret keys in subsequent encryption and decryption of messages. Generally, the transmitter selects a random bit and encodes the random bit based on a selected state of two pairs of quantum states.

The network interface (1108) includes a classical transceiver and a QC receiver that are coupled to the fiber (1106). The QC receiver is configured to detect quantum signals from the QC transmitter and assign suitable values. The QC receiver generally selects states from among pairs of states used by the QC transmitter. While the QC transmitter does not always select states corresponding the state used by the QC transmitter, additional classical communications permit establishment of keys. For example, the classical transceiver at the QC transmitter sends the basis used for sending each bit to the receiver, and the classical transceiver at the QC receiver sends the basis used for measuring each bit to the transmitter. Based on these communications, the transmitter and receiver can discard bits for which the receiver used a different basis. This basis information can be transmitted without encryption in a classical communication. In addition, the transmitter and receiver can be configured to compare some bits of the QC. In the presence of eavesdroppers, the receiver measurements typically have increased errors. If the receiver errors are too large, the transmitter can send new or additional QC signals to re-attempt key generation. If the number of receiver errors is acceptable, additional classical communications can be used for information reconciliation, privacy amplification, or other procedures associated with establishment of shared keys. This protocol is referred to as the BB84 protocol, but other protocols and conjugate bases can be used.

The network interface (1108) is configured so that the classical transceiver can send and receive data from user data gathering and/or control devices (1110) such as such as a PDC or PMU. As noted above, the classical transceiver is also configured for communication of parameters related to basis state comparisons, information reconciliation, privacy amplification, or other procedures associated with establishment of shared keys, but not requiring QC signals.

Figure 12:
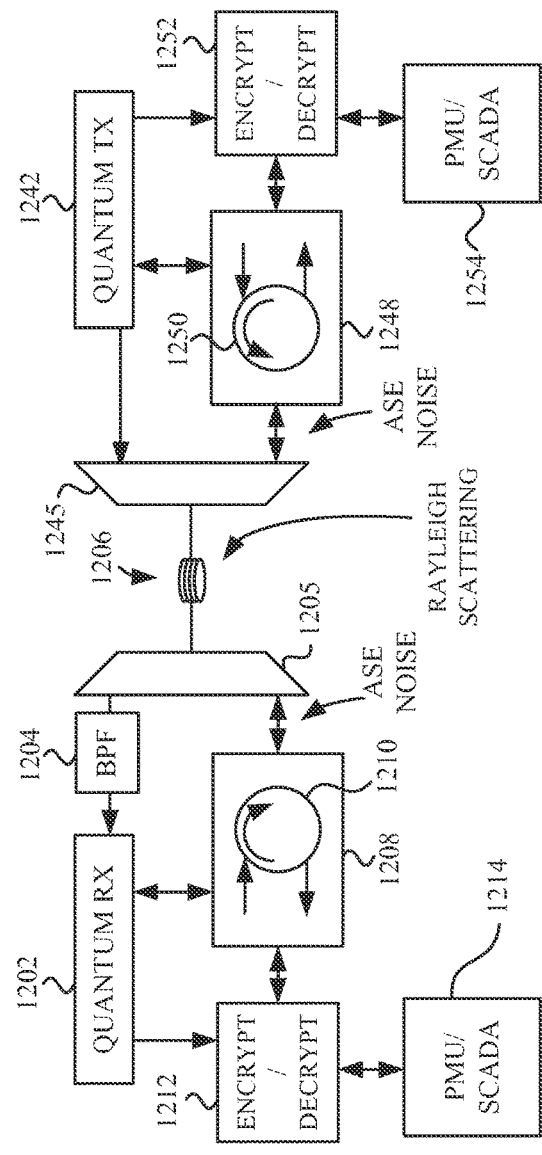
FIG. 12 is a block diagram of a representative quantum secured communication system ("QSC") that includes classical and quantum communications at respective wavelengths.

FIG. 12 illustrates a QSC system (1200) that is based on wavelength division multiplexing. A quantum transmitter (1242) that produces quantum signals at a first wavelength is coupled to a wavelength division multiplexer ("WDM") (1245) that couples the quantum signals to a fiber (1206). The quantum transmitter (1242) is also coupled to a classical transceiver (1248) that includes an optical circulator (1250). Classical data and/or commands from a data/control device such as a PMU or SCADA node (1254) are coupled via an encryption/decryption processor (1252) to the classical transceiver (1248). The classical transceiver (1248) produces a classical signal at a second wavelength that is combined with the QC signal by the WDM (1245) for communication to a WDM (1205) at the other node.

A combined QC/classical communication received by the WDM (1205) is separated so that QC signals (at the first wavelength) are directed to a quantum receiver (1202) via a bandpass filter ("BPF") (1204). Classical signals (at the second wavelength) are directed to a classical transceiver (1208) that includes an optical circulator (1210). An encryption/decryption processor (1212) is coupled to the quantum receiver (1202) and the classical transmitter (1208). A data and/or command source such as a PMU or SCADA node (1214) is coupled to the processor (1212) so that data for communication with the classical transceiver (1208) can be encrypted or decrypted. The encryption/decryption processors (1212, 1252) are configured to extract and store keys based on QC signal communication, after information reconciliation and privacy amplification or other processes if such processes are desired. In addition, QKD parameters (e.g., parameters related to basis state comparisons, information reconciliation, privacy amplification, or other procedures associated with establishment of shared keys, but not requiring QC signals) can be coupled from the quantum receiver (1202) and the quantum transmitter (1252) directly to the classical transceivers (1208, 1248), respectively, as these parameters generally do not require encryption.

As shown in FIG. 12, QC signals are at a first wavelength and classical signals are at a second wavelength. Convenient wavelengths are about 1550 nm and 1300 nm due to the relatively high transmittance of readily available communications optical fibers at these wavelengths. The WDMs (1205, 1245) add signals at both wavelengths so as to propagate in the single mode fiber (1206). The optical circulators (1210, 1250) couple ingoing and outgoing optical signals from a single fiber onto separate fibers inside the transceivers (1208, 1248), respectively. With ingoing and outgoing optical signals on separate fibers, outgoing optical signals can be filtered to reduce interference with QC signal photons. For classical transceivers operating at about 1310 nm, the associated transmission lasers typically emit in a broad spectrum that extends into the optical band at 1550 nm, so that a QC receiver/transmitter may receive unwanted classical transmitter optical powers. The circulators (1210, 1250) permit incoming signals to be transmitted without attenuation by filters selected to reduce this broad spectral background, requiring higher power in the classical (1310 nm) transmitters. FIG. 12 illustrates such background as amplified spontaneous emission ("ASE") which can be produced by classical transmitters.

Interaction of the relatively high power 1310 nm optical signals with an optical fiber can also result in Raman scattering of photons into a QC band, so that 1310 nm optical power in excess of that needed for classical communication is undesirable. In typical (classical) optical communication, the broad spectrum optical power from 1310 nm lasers is several orders of magnitude (10 s of dB) below the power level in the operating band depending on the wavelength where it is measured, and well below what a typical photodiode can detect. However, the single photon detectors used for QC signal detection can detect light at −110 dBm; by contrast, classical communication systems typically operate at ~0 dBm. The coexistence of classical and QC signals in the disclosed examples generally is based on reducing interfering optical signals in the QC band. In typical examples, classical signals are attenuated by at least 60, 70, 80, 90, 100, 110 dB using one or more spectral filters.

Figure 13:
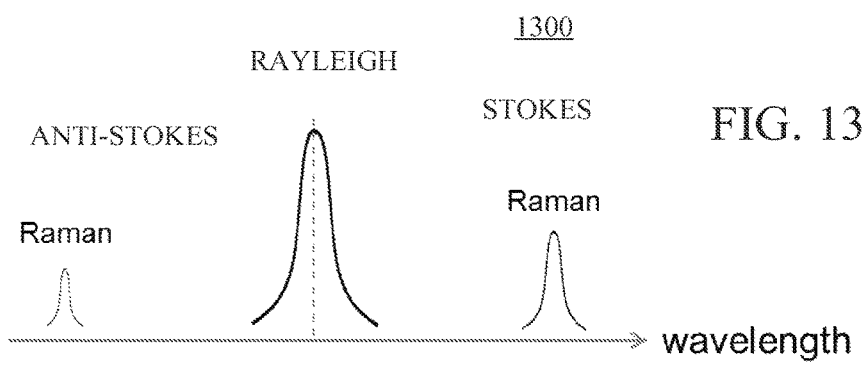
FIG. 13 illustrates some sources of background radiation that can disturb quantum communications.

Broadband background optical emission from classical transmitter sources such as laser diodes is not the only source of undesirable optical radiation. As shown in FIG. 13, a classical laser signal at an emission wavelength produces corresponding broadened Rayleigh backscattered radiation, as well as Raman scattered Stokes and anti-Stokes radiation. This effect is visible in graph 1300. If classical transceivers with a wavelength shorter than a QC wavelength are used, anti-Stokes radiation can appear in the QC wavelength band; for classical transceivers at a wavelength longer than the QC wavelength, Stokes radiation can appear in the QC band. Because anti-Stokes scattering is generally less efficient than Stokes scattering, selecting a QC wavelength shorter than a classical wavelength can be preferred. However, for some applications, a classical transceiver wavelength is determined by installed hardware, and wavelengths associated with QC and classical communications cannot be freely selected.

Figure 14:
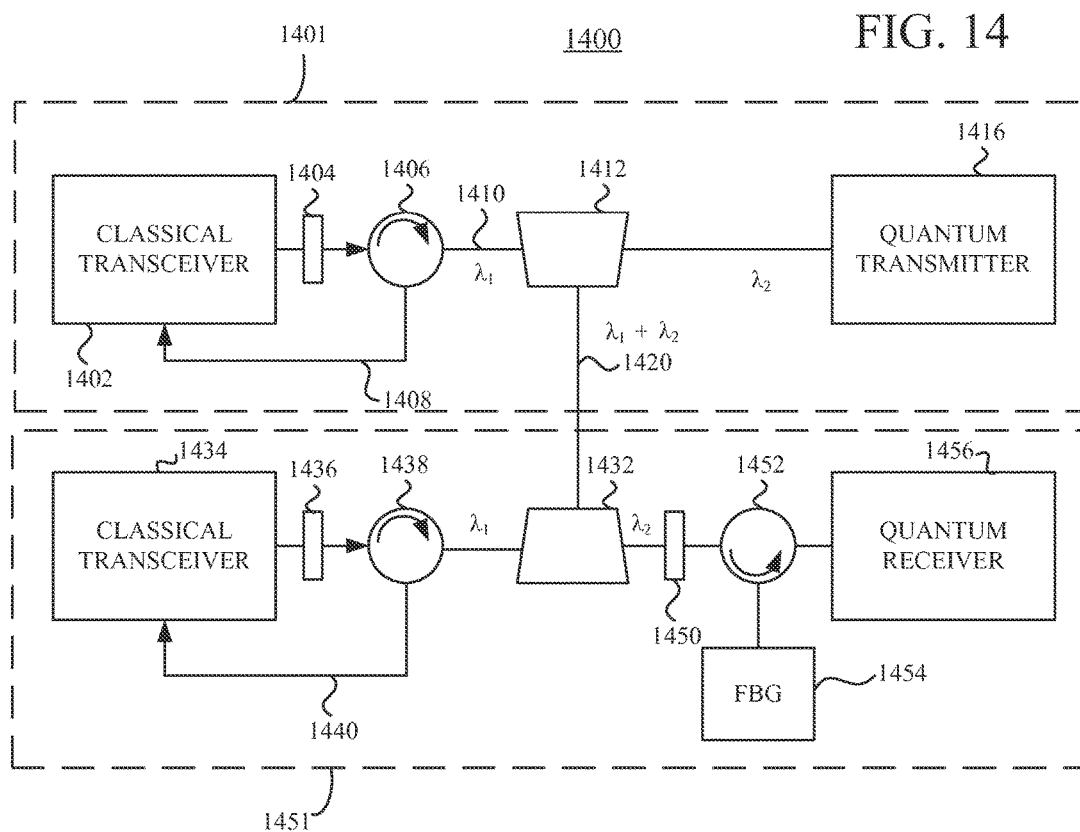
FIG. 14 is a block diagram of a representative quantum secured communication system that includes a Bragg filter associated with a quantum receiver. In the example of FIG. 14, duplex conventional communications use a first wavelength (for example, 1310 nm), while quantum communications operate on the same optical fiber at a second wavelength (for example, 1550 nm), and classical and quantum communications can co-exist.

Referring to FIG. 14, a QSC communication system (1400) includes a first QSC transceiver system (1401) and a second QSC transceiver system (1451) coupled to communicate over a fiber (1420). The first QSC transceiver system (1401) includes a classical transceiver (1402) that produces optical signals that are coupled to an optical circulator (1406) through a bandpass filter (1404). The classical transceiver (1402) is also configured to receive incoming optical signals from the circulator (1406) in the first wavelength band. With the arrangement of FIG. 14, incoming signals in a first wavelength band from a WDM (1412) can be routed to a fiber (1408) for detection while outgoing optical signals in the first wavelength band are coupled by the WDM (1412) to a fiber (1420). A common optical fiber (1410) couples incoming and outgoing optical signals to the WDM (1412). A quantum transmitter (1416) is configured to produce QC signals for QKD in a second wavelength band, and these signals are coupled to the fiber (1420) as well by the WDM (1412). In some examples, the common optical fiber (1410) is used for QC signals, and one-way classical communication instead of bidirectional communication, and an additional fiber (or other communication link) is provided for a second communication direction.

The second QSC transceiver system (1451) includes a classical transceiver (1434) that produces optical signals that are coupled to an optical circulator (1438) through a bandpass filter (1436). The classical transceiver (1434) is also configured to receive incoming optical signals from the circulator (1438). With the arrangement of FIG. 14, incoming signals in the first wavelength band from a WDM (1432) can be routed to a fiber (1440) while outgoing optical signals in the first wavelength band are coupled by the WDM (1432) to the fiber (1420). The use of a circulator is more efficient than a conventional fiber coupler, which introduces loss in separating incoming and outgoing optical signals. Using couplers could require higher classical optical powers, which are generally undesirable.

A quantum receiver (1456) is configured to receive QC signals for QKD in the second wavelength band from the fiber (1420). The WDM (1432) couples incoming QC signals to the quantum receiver (1456) via a bandpass filter (1450) (for example, a multilayer dielectric filter) and an optical circulator (1452) that is coupled to a fiber Bragg grating ("FBG") (1454). The QC signals are first filtered by the bandpass filter (1450). At the circulator (1452), the filtered QC signals are directed to the FBG (1454), and Bragg reflected, filtered QC signals are returned to the circulator (1452) and coupled to the quantum receiver (1456).

The circulator (1452) and the FBG (1454) provide additional filtering so that any non-QC signal radiation is attenuated, such that analysis by the quantum receiver (1456) is satisfactory. The QC signals are typically produced by an attenuated laser and are narrow-band so that spectral filtering at the output is unnecessary. In addition the narrow bandwidth of the QC signals permits use of a narrow bandwidth filter on signals to the quantum receiver (1456). The circulator/FBG combination shown in FIG. 14 serves as a narrow bandwidth filter that reduces the number of unwanted photons reaching detectors of the QC receiver (1456). For example, unwanted photons produced by Raman scattering of 1310 nm signals or residual broadband radiation that is not rejected by the filters (1404, 1436) can be further attenuated. In a representative example, a 1550-nm quantum channel can be configured to have >110 dB of isolation from a 1310-nm classical channel.

In some implementations, QC signal arrival times are used to identify QC signals to separate such signals from background radiation and detector noise. Time-filtering can be used to identify QC signals, and can be based on variable timings to accommodate different fiber lengths.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method of quantum-secured communications, comprising:
   accessing a message;
   determining, using an authenticator, an authentication tag for the message, the authentication tag being derived based on at least first and second portions of the message and at least a first quantum key, the first quantum key comprising a random series of bits generated based on measured quantum states of photons, wherein determining the authentication tag comprises:
      storing a first portion of the message in a buffer accessible by the authenticator,
      after storing the first portion of the message in the buffer and before storing the second portion of the message in the buffer, beginning to determine the authentication tag for the message by processing the first portion of the message using the first quantum key,
      storing the second portion of the message in the buffer, and
      after storing the second portion of the message in the buffer, continuing to determine the authentication tag for the message by processing the second portion of the message using the first quantum key; and
   sending the message and the authentication tag to a second device via a communication medium.

2. The method of claim 1, wherein the authenticator uses cyclic redundancy code operations.

3. The method of claim 1, wherein the authenticator employs a function $f(\alpha)$ that uses a binary polynomial $\alpha(x)$ based on the message, an irreducible binary polynomial p of degree b, and a b-bit quantum key k as the first quantum key.

4. The method of claim 3, wherein bits of the message are coefficients of the binary polynomial a(x) based on the message.

5. The method of claim 3, wherein the authenticator is based on:

$$f(\alpha)=\{[\alpha(x)\cdot x^b] \bmod p\}\oplus k,$$

where $x^b$ represents a b-bit shift, and $\oplus$ represents an XOR operation.

6. The method of claim 3, wherein the irreducible binary polynomial p is determined by:
  receiving a primitive polynomial q of degree b;
  determining a random polynomial n using the primitive polynomial q, a primitive element, and another quantum key r of the one or more quantum keys;
  constructing a b-bit tuple based on the random polynomial π;
  using the b-bit tuple to confirm that the quantum key r will yield a b-degree polynomial that cannot be reduced;
  determining a minimum polynomial m of the random polynomial π; and
  determining the irreducible polynomial based upon the minimum polynomial m and the primitive polynomial q.

7. The method of claim 3, wherein the irreducible binary polynomial p is reused in the authenticator for different messages but different values of quantum key k are used in the authenticator for the different messages.

8. The method of claim 1, wherein a computing device implementing the method is part of one of:
  a phasor measurement unit or phasor data concentrator in an electric grid;
  a node in a high-speed trading system;
  a control station in a water management system; or
  a control station in an oil or gas distribution system.

9. The method of claim 1, wherein quantum key distribution happens concurrently with message authentication.

10. The method of claim 1, wherein the message and authentication tag are sent to the second device as part of a data stream via a single fiber connection, and wherein the method further comprises repeating the accessing, the determining, and the sending for each of one or more other messages that are sent as part of other data streams multiplexed to support multi-level security on the single fiber connection.

11. The method of claim 1, wherein the authenticator uses hashing operations with Toeplitz matrices.

12. A computing device, comprising:
  a receiver operable to receive a stream of data units corresponding to a message;
  an authenticator configured to determine an authentication tag for the message, the authentication tag being derived based at least in part on at least a portion of the message and at least a first quantum key, the first quantum key comprising a random series of bits generated based at least in part on measured quantum states of photons, wherein the authenticator is further configured to use stream wise operations to derive the authentication tag by:
    receiving, at the receiver, at least a first one of the data units in the message,
    after the first one of the data units in the message has been received at the receiver and before at least a second one of the data units in the message has been received at the receiver, processing at least a first one of the data units in the message with the first quantum key, and
    after processing the first one of the data units with the first quantum key, receiving, at the receiver, at least the second one of the data units, and
    after receiving the second one of the data units at the receiver, processing at least the second one of the data units with the first quantum key; and
  a transmitter configured to send the message and the authentication tag to a second device via a communication medium.

13. The computing device of claim 12, wherein the authenticator is further configured to use cyclic redundancy code operations.

14. The computing device of claim 12, wherein the authenticator is further configured to employ a function $f(\alpha)$ that uses a binary polynomial $\alpha(x)$ based on the message, an irreducible binary polynomial p of degree b, and a b-bit quantum key k as the first quantum key.

15. The computing device of claim 14, wherein the authenticator is further configured to employ bits of the message as coefficients of the binary polynomial $\alpha(x)$ based on the message.

16. The computing device of claim 14, wherein the authenticator is based on:

$$f(\alpha)=\{[\alpha(x)\cdot x^b] \bmod p\}\oplus k,$$

where $x^b$ represents a b-bit shift, and $\oplus$ represents an XOR operation.

17. The computing device of claim 14, wherein the authenticator is further configured to determine the irreducible binary polynomial p by:
  receiving a primitive polynomial q of degree b;
  determining a random polynomial n using the primitive polynomial q, a primitive element, and another quantum key r of the one or more quantum keys;
  constructing a b-bit tuple based on the random polynomial π;
  using the b-bit tuple to confirm that the quantum key r will yield a b-degree polynomial that cannot be reduced;
  determining a minimum polynomial m of the random polynomial π; and
  determining the irreducible polynomial based upon the minimum polynomial m and the primitive polynomial q.

18. The computing device of claim 14, wherein the authenticator is further configured to reuse the irreducible binary polynomial p for different messages but to use different values of quantum key k for the different messages.

19. The computing device of claim 12, wherein the computing device is configured to be implemented as part of one of:
  a phasor measurement unit or phasor data concentrator in an electric grid;
  a node in a high-speed trading system;
  a control station in a water management system; or
  a control station in an oil or gas distribution system.

20. The computing device of claim 12, wherein the computing device is configured to implement quantum key distribution concurrently with message authentication.

21. The computing device of claim 12, wherein the transmitter is further configured to send the message and authentication tag to the second device as part of a data stream via a single fiber connection.

22. The computing device of claim 12, wherein the authenticator is further configured to use hashing operations with Toeplitz matrices.

* * * * *